(12) United States Patent
Dickmeyer et al.

(10) Patent No.: US 6,413,100 B1
(45) Date of Patent: Jul. 2, 2002

(54) SYSTEM AND METHODS FOR SEARCHING FOR AND DELIVERING SOLUTIONS TO SPECIFIC PROBLEMS AND PROBLEM TYPES

(75) Inventors: Jon Steven Dickmeyer, Fallbrook, CA (US); Kirk Brauer, Galveston, TX (US)

(73) Assignee: Netucation, LLC, Fallbrook, CA (US)

( * ) Notice: Subject to any disclaimer, the term of this patent is extended or adjusted under 35 U.S.C. 154(b) by 0 days.

(21) Appl. No.: 09/634,690

(22) Filed: Aug. 8, 2000

(51) Int. Cl.[7] .................................................. G09B 7/00
(52) U.S. Cl. ....................... 434/322; 434/323; 434/118; 434/191; 434/201; 434/350; 434/353; 434/298; 434/300; 434/302
(58) Field of Search ............................... 434/118, 191, 434/201, 350, 351, 353, 322, 323, 298, 300, 302; 707/1, 4, 100, 102, 103 R, 103 Y, 103, 103 Z, 104.1; 345/700, 733

(56) References Cited

U.S. PATENT DOCUMENTS

| | | | | |
|---|---|---|---|---|
| 5,721,845 A | * | 2/1998 | James et al. ................ 345/841 |
| 5,797,135 A | * | 8/1998 | Whalen et al. ........... 706/53 X |
| 5,864,844 A | * | 1/1999 | James et al. ................ 707/4 X |
| 5,890,911 A | * | 4/1999 | Griswold et al. ........ 434/322 X |
| 5,902,114 A | * | 5/1999 | Erickson ................ 434/188 X |
| 6,077,085 A | * | 6/2000 | Parry et al. ............ 434/322 X |
| 6,091,930 A | * | 7/2000 | Mortimer et al. ........ 434/362 X |
| 6,112,049 A | * | 8/2000 | Sonnenfeld ............. 434/350 X |
| 6,162,060 A | * | 12/2000 | Richard et al. ......... 434/118 X |
| 6,164,974 A | * | 12/2000 | Carlile et al. ............ 434/322 X |
| 6,171,109 B1 | * | 1/2001 | Ohsuga ................... 434/118 X |
| 6,267,601 B1 | * | 7/2001 | Jongsma et al. ........ 434/323 X |
| 6,302,698 B1 | * | 10/2001 | Ziv-El ..................... 434/323 X |
| 6,336,029 B1 | * | 1/2002 | Ho et al. ................. 434/362 X |

FOREIGN PATENT DOCUMENTS

WO    WO 00/62177    * 10/2000    ............ G06F/15/00

* cited by examiner

Primary Examiner—Joe H. Cheng
Assistant Examiner—Chanda Harris
(74) Attorney, Agent, or Firm—Lyon & Lyon LLP

(57) ABSTRACT

Methods and apparatus for providing a solution to a given problem comprising the steps of receiving a request for a solution to a known problem, accessing a first set of data comprising a plurality of template solutions to problems, accessing a second set of data comprising a plurality of problem variable value sets, interfacing the first set of data and the second set of data for generating a solution to the problem, and transmitting the solution over a computer network.

61 Claims, 21 Drawing Sheets

Netucation

(Answer Zone) (Contact Zone) (Arcade) (Settings) (Help)

Check Your Buddy List »

STEP 1
STEP 2
STEP 3

Click here to work a new problem

STEP 3

This system is equivalent to
2x - y = 6 (1)
- 3x + 4y = 1 (2),
which is obtained by changing the signs of terms with the variables to the opposite and moving them to the left hand side of the equations. We solve the latter system using elimination. Namely, multiply both sides of equation (1) by 4 and then add the resulting equation to equation (2), thus finding x:
4*(2x - y) = 4*6 -> 8x - 4y = 24
+
-3x + 4y = 1
5x = 25
x = 5
To find y, replace x by 5 in equation (1) and solve the resulting linear equation in one variable:
2*5 - y = 6 -> 10 - y = 6 -> y = 4,
Finally, check the obtained solution x = 5, y = 4 in the original equations (1) and (2):
2*5 - 4 = 6, and - 3*5 + 4*4 = 1
Answer: One medium will cost you x = 5 dollars, and one small with toppings y = 4 dollars.

1100 —

Does this answer your questions about this math problem?
» If not, you can try another problem of the same type
» Or find more help in the Chat Room (Answer Zone) (Contact Zone) (Arcade) (Settings) (Help) (Log Off)
Your Privacy  © 1999 Netucation, LLC. All Rights Reserved.
Please read our privacy policy. Site design credits.

Log Off When Finished

FIG. 17

SYSTEM AND METHODS FOR SEARCHING FOR AND DELIVERING SOLUTIONS TO SPECIFIC PROBLEMS AND PROBLEM TYPES

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention relates generally to information exchange services in education and more particularly to computerized systems, methods and apparatus for searching for problems or problem types and providing solutions to given problems or problem types over a global computer network. In addition, this invention relates to computerized systems, methods and apparatus for searching for given math, chemistry, physics, physical science, engineering, biology, biochemistry, molecular biology, pharmacology, and computer science problems and problem types, and for providing solutions to math, chemistry, physics, physical science, engineering, biology, biochemistry, molecular biology, pharmacology, and computer science problems and problem types over a global computer network. More specifically, the present invention relates to computerized systems, methods and apparatus which enable students to instantly obtain solutions to the math, chemistry, physics, physical science, engineering, biology, biochemistry, molecular biology, pharmacology, and computer science problems contained in their textbooks or homework assignments, and to search for other math, chemistry, physics, physical science, engineering, biology, biochemistry, molecular biology, pharmacology, and computer science problems.

BACKGROUND OF THE INVENTION

The present invention uses global computer networks, such as the Internet to provide students with additional help with their studies. The Internet comprises a large number of computers and computer networks that are interconnected through communication links. The Internet utilizes the TCP/IP suite of protocols, which are well-known in the art of computer networking. TCP/IP is an acronym for "Transport Control Protocol/Interface Program," a software protocol developed by the Department of Defense for communication between computers.

The interconnected computers exchange information using various services, such as electronic mail, Gopher, and the World Wide Web ("WWW"). The WWW service allows server computer systems (i.e., web server or web site) to send graphical web pages of information to remote client computer systems. A remote client computer system can then display the web pages.

Each resource, (e.g., computer or web page) of the WWW is uniquely identifiable by a Uniform Resource Locator ("URL"). To view a specific web page, a client computer system specifies the URL for that web page in a request (e.g., a HyperText Transfer Protocol ("HTTP") request). The request is forwarded to the web server that supports that web page. When that web server receives the request, it sends that web page to the client computer system. When the client computer system receives that web page, it typically displays the web page using a browser. A browser is a special-purpose application program that effects the requesting and displaying of web pages.

Currently, web pages are typically defined using HyperText Markup Language ("HTML"). HTML provides a standard set of tags that define how a web page is to be displayed. When a user indicates to the browser to display a web page, the browser sends a request to the server computer system to transfer to the client computer system an HTML document that defines the web page. When the requested HTML document is received by the client computer system, the browser displays the web page as defined by the HTML document. The HTML document contains various tags that control the displaying of text, graphics, controls, and other features. The HTML document may contain URLs of other Web pages and web sites available on that server computer system or other server computer systems.

Localized and globalized computers are growing and beginning to be the primary means of accessing information. The World Wide Web ("WWW"), for example, provides all who have access to it with vast amounts of information, with new information being added every second of every day. The WWW contains web sites with information about everything from South American rain forests to health and medicine to automobile sales.

The WWW began as a tool that allowed information to be accessible over a network for educational purposes. Initially, it was primarily used by universities and government entities for the purpose of sharing information. Today, it is still used most often as a means of finding and sharing information, and its most important objective is still to educate people.

The WWW contains many educational web sites with topical information for students. For example, Educational web sites, such as Encyclopaedia Britannica (EB.COM) or the Teens section of About.com, contain generalized information about different topics to help students gain knowledge and learn.

Thus, the WWW has made it possible to provide students with information twenty-four hours a day, seven days a week with few, if any, interruptions in service. That notwithstanding, there are few online resources that provide students with targeted information to assist them with their math, physics and sciences homework and to help them improve their skills therein. Furthermore, there are no online resources for providing students with instantaneous solutions to the problems in their textbooks.

In fact, there are few resources of any kind presently available that provide people with instantaneous solutions and answers to textbook problems and problem solving techniques. Teacher manuals often include solutions to the problems in student textbooks, but are not usually available to students. Tutors and teachers can also assist students with solving problems, but they are not constantly available to students, and tutors can cost as much as $75.00 per hour in many areas of the United States, and are for that reason, inaccessible to the majority of students. The textbooks themselves usually have explanations and examples, but all problems are different and so are all students. Even with the explanations and examples from a textbook, a student may not be able to understand a particular problem nor be able to determine its solution. Even scientific calculators are inadequate because 1) they require the student to input the problem, which can be a daunting exercise in itself, 2) they do not provide a step-by-step solution to the problem, 3) they are often very complicated and difficult to use and understand, and 4) they are expensive, and many students cannot afford them.

One educational resource, Pinkmonkey.com, provides an educational environment for primary school students. It provides students with study guides, reference materials, a library of books available online, and various other helpful resources. It does not, however, provide students with solutions to specific problems, nor does it provide a way to teach students how to solve particular types of problems. It is also incapable of searching for particular types of problems based on certain criteria provided by the student.

Another educational resource, Webmath.com, is composed of math "fill-in-forms". A student can type into the math fill-in-form the math problem they are working on, and a math program will attempt to solve the problem for the student. The math programs in Webmath.com also provide step-by-step solutions to the problems. But, again, Webmath.com cannot solve problems unless the student undertakes the tedious and time-consuming task of inputting the math problem. Because math symbols are not on most computer keyboards, this can be very time-consuming, especially with long and complicated math problems. Like Pinkmoney.com, Webmath.com does not provide a way of searching out specific types of problems based on criteria provided by the student. Furthermore, there are no resources comparable to Webmath.com for chemistry, physics, and physical science.

Not all students are created equal, and this difference in ability creates a problem for many students who are either overly challenged or unchallenged by the curriculum and their teachers. For those who are falling behind, especially in the math and sciences, even the WWW currently does not provide sufficient educational resources. Thus, a student who does not understand a math problem, for example, has no choice but to seek assistance from parents, teachers or tutors. Typically, even educated parents themselves do not understand the problems, and teachers and tutors are often not accessible when the student needs them. The student has no choice but to struggle to no avail, or give up on the problem entirely.

Another problem is that teachers are also not created equal. Thirty percent of teachers do not even have a minor in the subject they teach. Thus, many teachers are unqualified to teach the subjects that they are assigned, and this leaves students unprepared to confront the problems that they are asked to do for homework, most of which come straight out of textbooks. And when they go home, there is often nobody there to help them when they arrive at a problem that they do not understand and cannot solve without assistance.

The described circumstances lead many children to fear or dislike particular subjects with which they are struggling. This, in turn, causes lowered self-esteem and lower grades in students that could do well in those subjects if given the proper education and resources.

Individually solving each question of each textbook used in, for example, the United States, is an unthinkable task amounting to an enormous amount of data. This is the primary reason why there currently is no Internet web site that provides solutions to the problems of a vast number of textbooks.

Therefore, a need exists for a way of providing solutions to textbook problems that do not require individually solving each problem. A need also exists for computerized systems, methods, and apparatus for providing a solution to a given problem over a global computer network. A need also exists for online resources that can search for and provide students with specific problem types targeted at those specific areas with which they are having trouble.

SUMMARY OF THE INVENTION

In accordance with the present invention, the disadvantages and problems associated with providing solutions to problems have been substantially reduced or eliminated. One innovative aspect provides a method of providing a solution to a given problem. The method includes the steps of receiving a request for a solution to a known problem, accessing a first set of data from a template object comprising a plurality of template solutions to problems, accessing a second set of data from a problem variable value set object comprising a plurality of problem variable value sets, interfacing the first set of data and the second set of data for generating a solution to the problem, transmitting the solution over a computer network. The solution to the problem can be an interim solution comprising a mathematical equation imbedded therein, and can further include the steps of providing a math computation program capable of running solutions to mathematical equations, and running the solution to the mathematical equation.

Each step can be accomplished using a computer, such as a network server or any other type of computer. Furthermore, the template object and the problem variable value set object can be stored within one database or they can be stored in separate databases. Furthermore, the problem variable value set can include value elements, such as integers, numbers or mathematical symbols, symbols associated with physics or chemistry, words, images, equations, or any figure that represents a value. The values can be taken from problems in textbooks, such as math problems, chemistry problems, physics problems, physical science problems, engineering, problems, biology problems, biochemistry problems, molecular biology problems, pharmacology problems, or computer science problems.

This method can also include the step of providing a graphical user interface comprising one or more data input fields for inputting data comprising an identifying property of a textbook. The identifying property of the textbook can be an ISBN number, the author's name, the title of the textbook, the copyright date, the publisher, or any other identifying property or characteristic of a textbook. The graphical user interface can also include one or more data input fields for inputting data comprising an identifying property of a problem from a textbook. This can include the user's/student's school, class, and teacher, either manually inputted by the user/student or provided to him/her through a drop down menu. Stored in a computer readable medium is retrievable data comprising information about textbooks used by different schools, classes and even individual teachers or educators within a school.

Textbooks include conventional printed matter on paper as well as electronic textbooks. Electronic textbooks can include textbooks stored in a computer readable medium, the contents of which are accessible and viewable through various electronic devices, such as the Rocket eBook Pro® and other Pocket PC devices including the HP Jornada 545, the HP Jornada 548, the Casio E-115, the Casio EM-500, the Casio EG-80, the Casio EG- 800, the Compaq iPAQ, and the Compaq Aero 1500. Electronic textbooks can also be downloaded onto personal computers and viewed and read using such software as Microsoft Reader™.

In accordance with another innovative aspect of the invention, a system for providing a solution to a given problem includes a computer readable medium and a computer program. The computer readable medium can comprise a subject object having index codes, a template object having indexed template solutions to problems, each of which contains at least one variable element, and an indexed problem variable value set object including problem variable value sets, each of which contains at least one value element. The template solutions and the problem variable value sets can be associated with index codes from the subject object. Furthermore, a value element can be a value from a problem in a textbook. The subject object can include a number of subject topics in varying degrees of specificity, each of which is associated with an index code. Each subject topic can have an exposition associated with it, and the exposition can have an index code corresponding to the index code of its associated subject topic.

The computer program can be capable of matching an index code associated with a template solution with an index code associated with a problem variable value set and replacing a variable element with a value element to form a solution to a problem. And, the system can further include a second computer program capable of real-time math computation to solve mathematical equations.

The system can also include a graphical user interface having data input fields for inputting data comprising identifying properties of textbooks, and the computer readable medium can include a textbook object having data including identifying properties of textbooks. The identifying properties of textbooks can include ISBN numbers, author names, titles, copyright dates, publishers, or any other identifying properties or characteristics of a textbook. And, again the graphical user interface can include a drop down menu or open input fields concerning information about the user's/ student's school, class and teacher, and the textbook can be identified based on such information.

The system can also include a graphical user interface having data input fields for inputting data comprising identifying properties of problems from textbooks, and the computer readable medium can include a textbook problem object having data including identifying properties of textbook problems. The identifying properties of problems can include problem numbers, page numbers from textbooks, and any other identifying properties.

Another innovative method of providing solutions to given problems includes the steps of providing a textbook object, providing a subject object, providing a textbook problem object, providing a template object, providing a problem variable value set object, providing a first computer program, providing a second computer program, receiving a request for a solution to a problem, accessing a template solution, using the first computer program to form an interim solution to the problem, wherein the interim solution includes a mathematical equation imbedded in it, using the second computer program to solve the mathematical equation, and transmitting the final solution over a computer network. This embodiment can also include graphical user interfaces as described above.

Each of the objects can be stored in computer readable memory well-known by those skilled in computer and software engineering. The textbook object can include data such as identifying properties of textbooks, which can include ISBN numbers, author names, titles, copyright dates, publishers, or other identifying properties. The subject object can include index codes and subject topics in varying degrees of specificity, each of which is associated with an index code. The textbook problem object can include data such as identifying properties of textbook problems. Such identifying properties can include index codes or problem numbers. The template object can include various template solutions, each of which can contain a variable element.

Each template object can also be associated with an index code from the subject object. The problem variable value set object can contain problem variable value sets, each of which can contain a value element. Each problem variable value set object can also be associated with an index code from the subject object.

There can be various permutations for each template, each permutation corresponding to a different approach to solving a problem. Thus, the index code for each permutation of a particular template can further include an approach-identifier that is unique to that approach of problem solving. These approaches correspond with different ways of thinking, and provide students with alternative ways of solving problems.

The first and second computer programs are capable of various actions. The first computer program can be capable of matching like index codes and replacing variable elements from the template solutions with value elements from the problem variable value sets. Thus, the interim solution to the problem is formed by using the first computer program to replace variable elements with value elements. The second computer program can be capable of real-time math computation. Thus, the final solution to the problem can be formed by using the second computer program to run a solution to a mathematical equation imbedded in the interim solution.

In another innovative aspect, a method of providing a solution to a given problem includes the steps of providing a template object having template solutions, each of which contains a variable element as described above, providing a problem variable value set object having problem variable value sets, each of which contains a value element as described above, providing a computer program capable of replacing variable elements with value elements, receiving a request for a solution to a problem, and replacing a variable element from one of the template solutions with a value element from one of the problem variable value sets to form a solution to the problem. This method can also include the step of providing a graphical user interface having data inputs for inputting data comprising identifying properties of textbooks. Furthermore, this method can include the step providing a graphical user interface comprising data inputs for inputting data comprising identifying properties of problems from textbooks.

In another innovative aspect a computer readable medium of instructions is provided. The computer readable medium of instructions can include a first data structure, a second data structure, and a computer program. The first data structure can have a first set of information relating to a problem from a textbook. The first set of information can include value elements corresponding to values given in problems in textbooks. The second data structure can have a second set of information relating to a solution to a type of problem. The second set of information can include variable elements.

The computer readable medium of instructions can also include a third data structure including a third set of information relating to a type of problem. The information in the third data structure can include instructional expositions.

The computer program can be capable of controlling a computer to search the first, second, or third set of information for designated information provided by a designator and informing the designator when the designated information has been found. The computer program can also be capable of linking the first set of information with the second set of information to form a solution to a problem. The computer program can also be capable of controlling the computer to upload the solution to the problem to a medium external of the computer. The computer program can also be capable of replacing variable elements with value elements to form solutions to problems.

Alternatively, a second computer program can be included, and it can be capable of linking the first set of information with the second set of information to form a solution to a problem. The second computer program can also be capable of controlling the computer to upload the solution to the problem to a medium external of the computer. The second computer program can also be capable of replacing variable elements with value elements to form solutions to problems.

Other objects and features of the present invention will become apparent from consideration of the following detailed description and appended claims taken in conjunction with the accompanying drawings.

BRIEF DESCRIPTION OF THE DRAWINGS

FIG. 17 is an example of a screen display depicting an example of the third step in solving the problem depicted in FIG. 16, wherein the third step includes both verbal explanations and mathematical solution steps.

DETAILED DESCRIPTION OF THE PREFERRED EMBODIMENT

Figure 1:
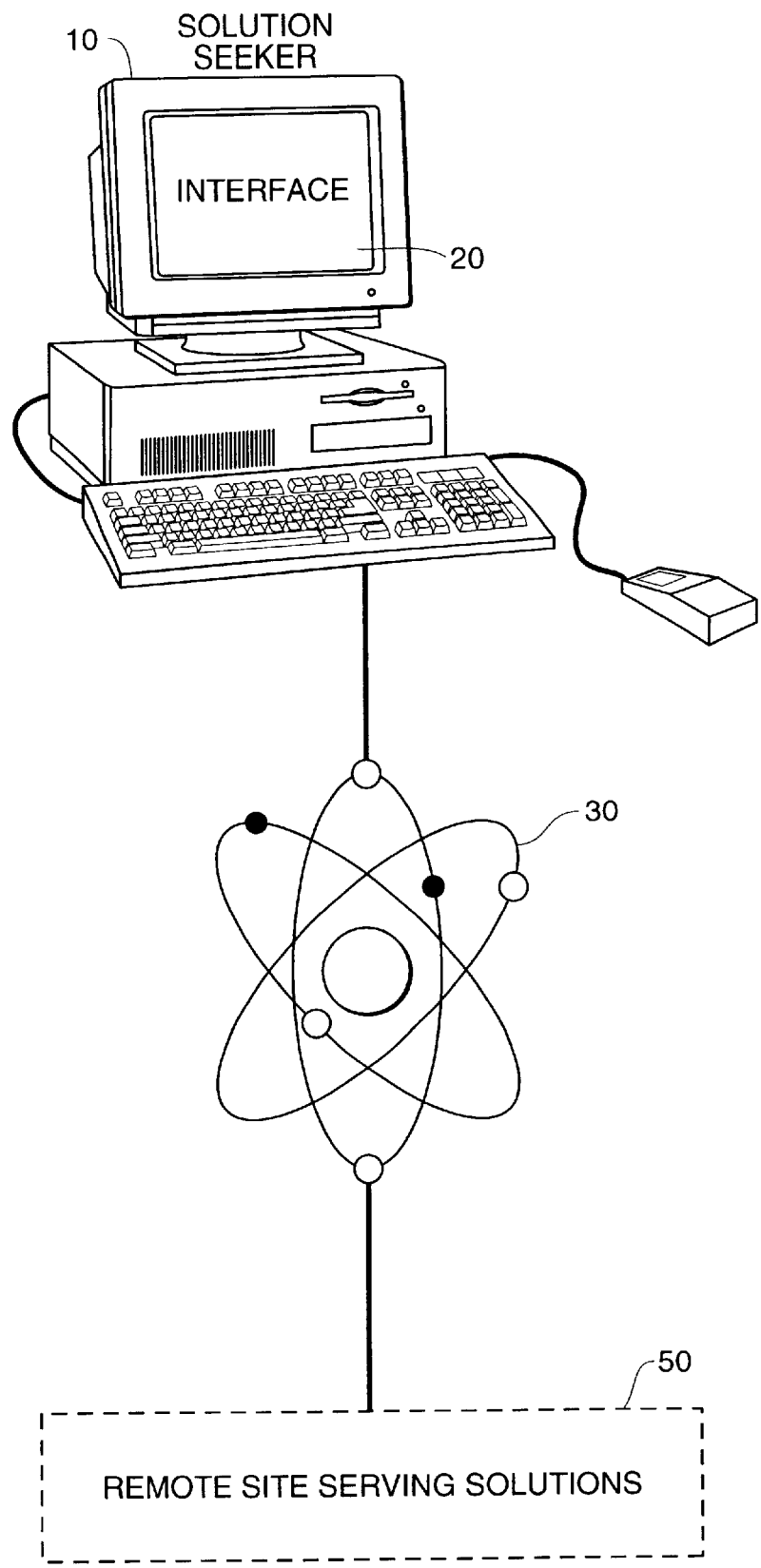
FIG. 1 is a diagrammatic illustration of a computerized solution search and delivery system according to one embodiment of the present invention.

An overview of an embodiment of the present invention is illustrated in FIG. 1. Specifically, this figure illustrates a relationship between a computer 10 a remote web site 50 serving solutions to problems, the connection between the two through the Internet 30, and a graphical user interface 20. The computer 10 is used by a person searching for a solution to a given problem from a textbook or to general solutions and expositions on topics in math, chemistry, physics, physical science, engineering, biology, biochemistry, molecular biology, pharmacology, and computer science. The remote web site 50 serves solutions to specific problems from math, chemistry, physics, physical science, engineering, biology, biochemistry, molecular biology, pharmacology, and computer science, including solutions to specific problems from textbooks. The web site also serves general expositions and tutorials relating to topics within the aforementioned fields. The interface 20 facilitates the communication between the computer 20 of the person searching for solutions and the web site 50, and this communication is achieved via the Internet.

The computer operations 100 performed by computers, servers, or personal computers running computer software according to an embodiment of the present invention will now be described. The computer readable software is written in the form of a computer executable program (hereinafter "web site program" or "computer program"), typically in the form of a magnetic diskette or CD ROM, and is written, for example, in scripting languages such as C, Visual C++, HTML, JAVA, SQL, Visual Basic, Lingo, MAC OS, CGI and the like.

Specifically, the web site program or computer program that is run by web site computers or servers 50, or personal computers is compatible for use with Windows NT™, Windows 95™, Windows 98™, other Windows based operating systems, MAC OS, or Linux, but can be written in any language that is executable by any type of computer, and can be configured to be compatible for use with any type of operating system, software or web browser. The web site program or computer program can be stored on any computer readable medium, such as CD, floppy disk, hard drive, optical disks or the like, and can be transmitted from one computer to another by e-mail, upload/download, or in any other known manner.

Figure 2:
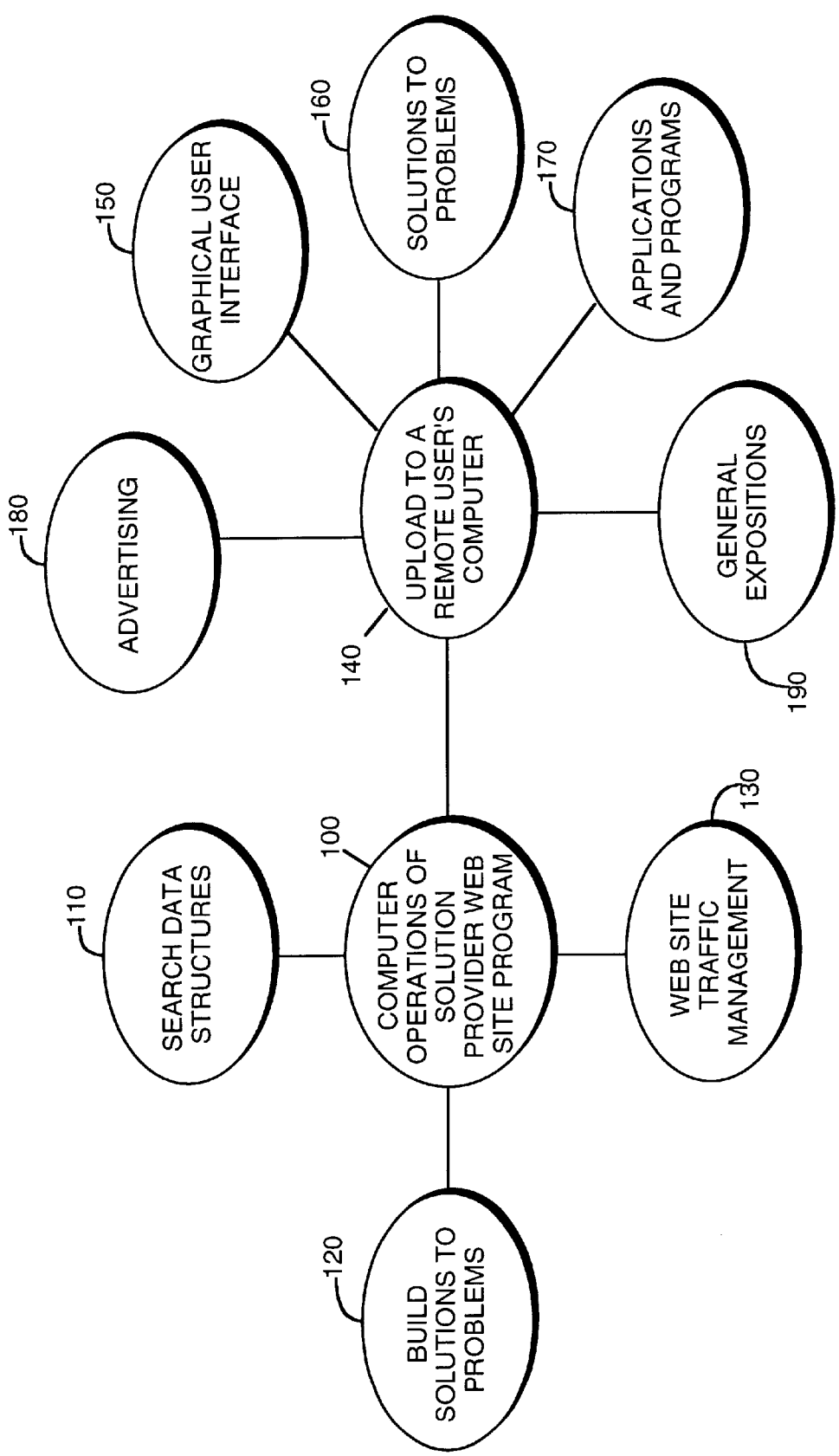
FIG. 2 is a state diagram illustrating an example of operations performed by a computer running software according to one embodiment of the invention.

FIG. 2 is a state diagram illustrating examples of the tasks that the web site program or computer program controls. That is, the overall operation 100 of the web site computers, servers 50, or personal computer as controlled by the web site program or computer program includes a search data structures operation 110, a traffic management operation 130, a build solutions to problems operation 120, and an upload operation 140. The upload operation 140 includes the ability to upload advertising 180, graphical user interfaces 150, solutions to specific problems and problem types 160, general expositions 190, and other programs/applications 170. The web site program or computer program can be one individual program or a plurality of associated programs that work together to accomplish the operations described herein.

Figure 3:
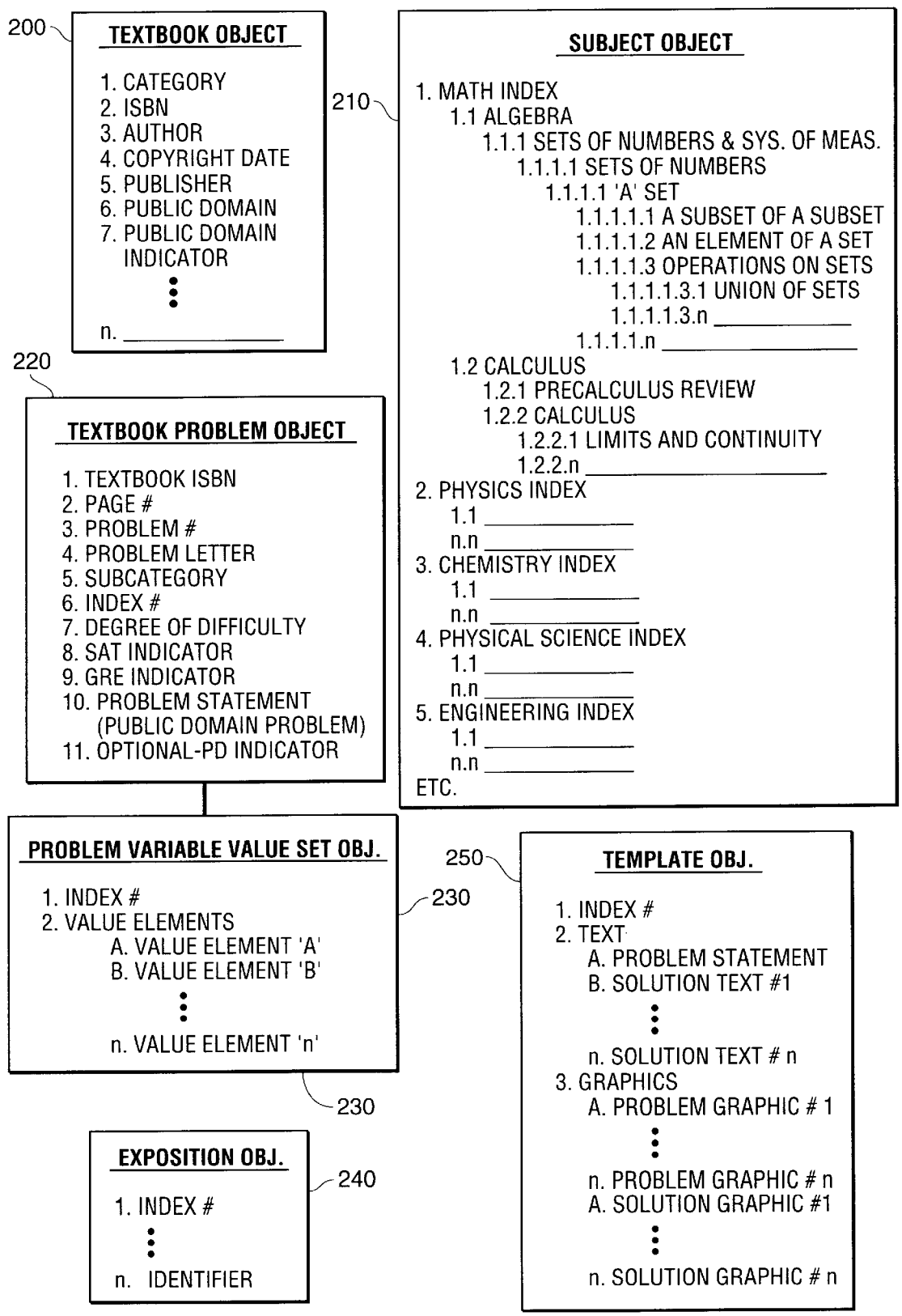
FIG. 3 is a schematic representation of an example of the objects associated with the computerized solution search and delivery system of the present invention.

The web site program or computer program as explained above is capable of searching data structures, sometimes referred to herein as "objects". The objects associated with one example of a system for providing solutions to problems is shown in FIG. 3 and include a textbook object 200, a subject object 210, a textbook problem object 220, a problem variable value set object 230, an exposition object 240, and a template object 250.

The textbook object 200, includes information about specific textbooks. The information can include a category type for a textbook, a textbook's ISBN number, a textbook's author(s), a textbook's copyright date, a textbook's publisher, a textbook's title, or any other information that can be used to identify a textbook.

The subject object 210 is a categorized and indexed list of subjects in the fields of math, chemistry, physics, physical science, engineering, biology, biochemistry, molecular biology, pharmacology, and computer science, but other areas of learning can also be indexed. The index is arranged by associating index codes with categories and topics. Broad categories have fewer digits in their index codes than narrow specific topics. For example, the index code for the category of Algebra can be 1.1, whereas the index code for the topic of sets of numbers within the category of Algebra can be 1.1.1.1. The index codes can comprise numbers, letters, or symbols. Each category and topic includes a unique index code that identifies that particular category or topic. The following is an example of a portion of an index for Calculus:

1. Precalculus Review
　1.1 Precalculus Review: Algebra
　1.2 Precalculus Review: Functions and Their Graphs
　1.3 Precalculus Review: Trigonometry
　1.4 Precalculus Review: Exponentials and Logarithms
　1.5 Precalculus Review: Conic Sections
2 Calculus
　2.1 Limits and Continuity
　　2.1.1 Introduction to Limits
　　　2.1.1.1 Limit of a Function
　　　2.1.1.2 One-Sided Limits
　　　2.1.1.3 Relationship between One-Sided Limits and Limits
　　2.1.2 Definition of Limit
　　　2.1.2.1 Definition of Limit of a Function
　　　2.1.2.2 Alternative Definition of Limit of a Function
　　　2.1.2.3 Properties of Limit of a Function
　　2.1.3 Techniques for Finding Limits
　　　2.1.3.1 Limit of a Sum of Functions
　　　2.1.3.2 Limit of a Product of Functions
　　　2.1.3.3 Limit of a Difference of Two Functions
　　　2.1.3.4 Limit of a Quotient of Two Functions
　　　2.1.3.5 Limit of a Linear Function 2.1.3.5.1 Limit of a Constant
　　　2.1.3.6 Limit of Natural Power of a Linear Function
　　　2.1.3.7 Limit of a Polynomial Function
　　2.1.4 Limits Involving Infinity
　　　2.1.4.1 Definition of limit of a Function as x Tends to Positive Infinity
　　　2.1.4.2 Definition of Limit of a Function as x Tends to Negative Infinity
　　　2.1.4.3 Limit of a Rational Function as x Tends to Infinity
　　　2.1.4.4 Definition of an Infinite Limit of a Function as x Tends to a Finite Number
　　2.1.5 Continuous Functions
　　　2.1.5.1 Definition of a Continuous Function
　　　2.1.5.2 Properties of Continuous Functions
　　　2.1.5.3 Intermediate Value Theorem
　2.2 The Derivative
　　2.2.1 Tangent Lines
　　　2.2.1.1 Secant Line
　　　2.2.1.2 Slope of the Tangent Line to the Graph of a Function
　　　2.2.1.3 Equation of the Normal Line to the Graph of a Function
　　2.2.2. Rates of Change
　　　2.2.2.1 Average Velocity
　　　2.2.2.2 Instantaneous Velocity
　　　　©Netucation LLP, 2000

The textbook problem object 220 contains information regarding specific problems from textbooks. Each problem stored in this object format can contain the ISBN number of the textbook where the problem is found, the page number of said textbook, the problem number, the problem letter, subcategories, an associated index code from the subject object 210, and various other descriptors such as a degree of difficulty descriptor, an SAT indicator for those types of problems that are tested on the SAT, a GRE indicator for those types of problems that are tested on the GRE, an ACT indicator for those types of problems that are tested on the GRE, and any other identifiers or descriptors that may be required to identify the correct problem.

In the case of, for example, a math problem from a textbook that is in the public domain, a record of that problem can also include the exact problem statement from the textbook. Furthermore, public domain problems can include a public domain identifier, or alternatively, the problem statement associated with public domain problems can act as a public domain identifier. Textbooks that are no longer protected by copyright are considered to be in the public domain, and all problems from those textbooks are herein called public domain problems.

The index code associated with each particular problem is chosen based on where the problem would best fit within the subject object 210. For example, a calculus problem that tests the topic of limits of continuity would be given the index code that is associated with that topic.

The problem variable value set object (PVVSO) 230 can be a stand-alone data structure or can be a part of the textbook problem object 210. If the PVVSO 230 is a stand-alone object, each record in that object can contain a problem variable value set, a reference number, and an index code from the subject index. The reference number is identical to a reference number in the record of the corresponding problem in the textbook problem object 220. If the PVVSO 230 is not a stand-alone object but is incorporated into the textbook problem object 220, no reference numbers are needed because each problem variable value set can be a part of a record in the textbook problem object 220.

In any case, the two objects are uniquely linked. The problem variable value set object contains information relating to specific problems from textbooks. Problem values from a particular problem can be stored in this object in the form of problem variable value sets. Each problem variable value set contains an index code, which is the same index code associated with the particular problem from which the problem values were taken. The value elements of each problem variable value set are stored such that the web site program or computer program can retrieve those value elements and insert them each in appropriate positions within a solution template, which will be described hereinafter. The following pre-algebra problem provides an example:

$$2x+8=24, \text{ what is } x?$$

An example of a template solution to this problem would be:

$$Bx+y=z$$

$$Bx=z-y$$

$$Bx/B=z-y/B$$

$$x=z-y/B$$

The value elements for this problem are 2, 8, and 24, and they replace the template solution variable elements B, y, and z respectively.

Problems from textbooks, particularly math and physics problems, can be infinitely more complex than this example. Nevertheless, each problem usually has a value element, although it does not necessarily have to be represented by an integer, and those value elements can be extracted from the problem and can be stored in the problem variable value set object 230 as part of a problem variable value set.

The template object 250 has stored therein records of template solutions to problems. Each template solution record has an index code from the subject index. The index code is chosen based on the particular topic and category with which the template solution is most closely associated. For example, a template solution to an algebra problem dealing with an element of a set has the same index code as the index code given to the topic "An Element of a Set" in the subject object. Thus, if the topic "An element of a Set" has the index code 1.1.1.1.2, then a template solution that solves a problem dealing with an element of a set also has the index code 1.1.1.1.2.

Also, template solutions can vary depending on degree of difficulty. For example, the aforementioned topic "An Element of Set" can have problems of varying degrees of difficulty. An easy problem can have the index code 1.1.1.1.2.A, and that index code will also be in the record of a template solution to that kind of problem. An intermediate level problem dealing with "An Element of Set" can have the index code 1.1.1.1.2.B, and that index code will also be in the record of another template solution to that kind of problem. Finally, an advanced level problem dealing with "An Element of a Set" can have the index code 1.1.1.1.2.C, and that index code will also be in the record of another template solution to that kind of problem. Whenever a template has more than one version or level, all problems associated with that template will have index codes indicating the appropriate version associated with that problem.

Template solutions can also vary in mechanical approaches to problem solving. Each mechanical approach can solve the same problem, but in different ways. Each mechanical approach can represent a particular way of thinking or conceptualizing. This is to account for the different ways in which people think and approach problem solving. Moreover, the graphical user interface can include a data input field, such as a drop down menu, to allow the user to establish a default setting for mechanical approaches. Thereafter, and until the setting is changed, the web site program or computer program will search for mechanical approaches best suited to the user's way of conceptualizing based on the default set by the user.

Each template solution can further include a problem statement, the text of a solution, and there can be more than one text to a solution, and graphics associated with each problem statement and solution text. Furthermore, each template can either be static, or dynamic. Dynamic templates may include those which are programmed for animation with such applications as Shockwave™, Lingo, or Visual Basic to constitute active server pages.

Figure 4:
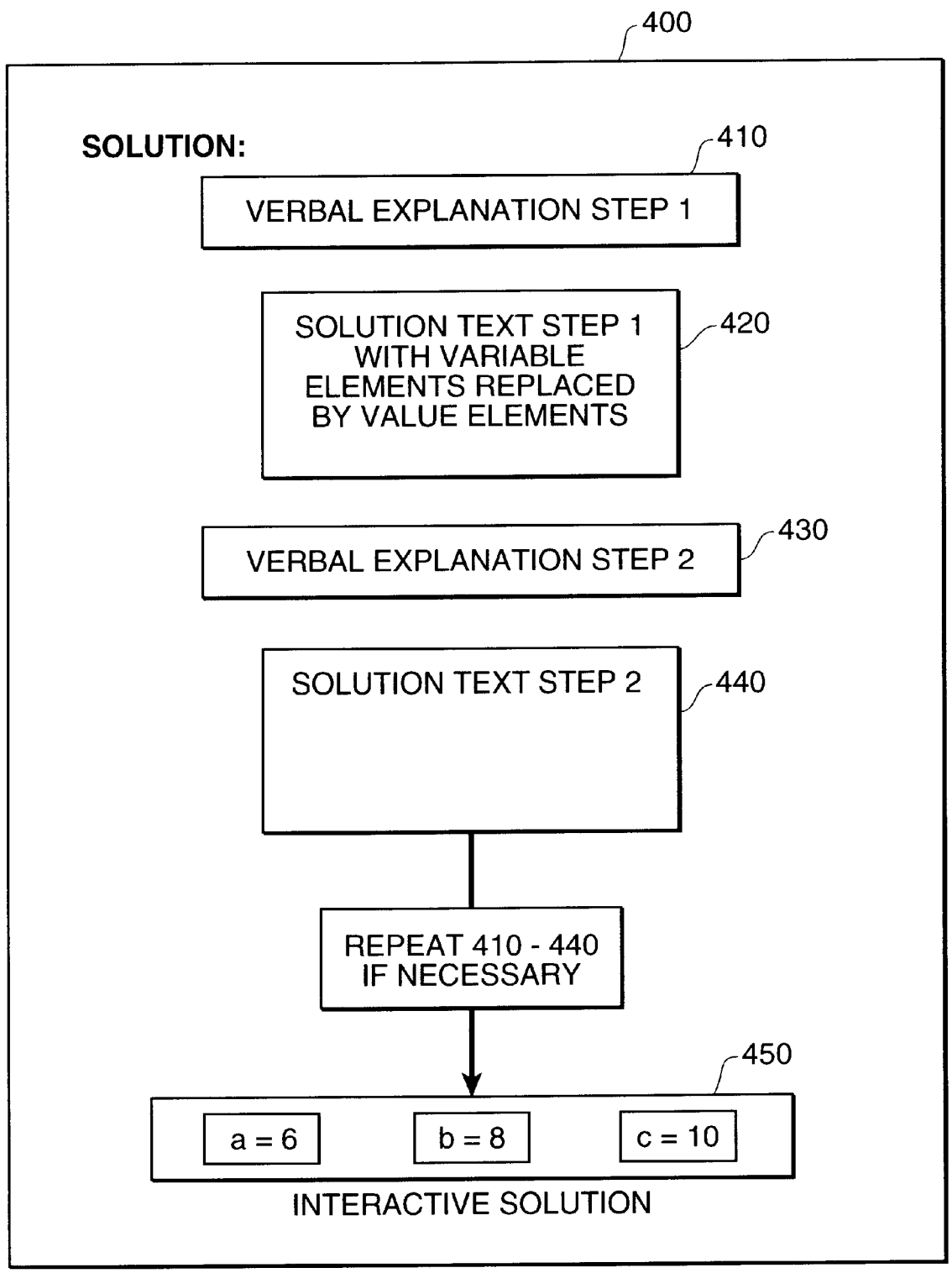
FIG. 4 is an illustration of an example of a computer display depicting a solution to a problem.

FIG. 4 shows an example of a solution that is displayed after the particular problem is identified by the web site program or computer program. Verbal explanations 410 and 430 are taken from the relevant template from the template object 250, and the relevant value elements from the relevant problem variable value set can be inserted into the verbal explanations 410 and 430 using, for example, visual basic or C++ programming language. The solution texts 420 and 440 can have the value elements associated with the particular problem, and can be animated with, for example, Shockwave™. Again, the variable elements in the solution text are replaced with value elements from a problem variable value set associated with the particular problem to be solved. Temporary values are generated when mathematical calculations are performed with the Shockwave™ application via Lingo programming. Animation can also be performed as terminal server applications with Visual Basic or Visual C++ programming.

This sort of programming can deliver a Shockwave™ movie to the user, and said movie can be controlled by the user through standard Shockwave™ features. The user can control the flow of the animated solution with fast-forward, reverse, and stop functions. The GUI 400 can comprise fast-forward, reverse, and stop buttons (not shown) to enable the user to control these features.

In the interactive solution portion 450, value elements can be entered by the user directly into the web page for the solution to be found. Thus, not only can particular problems from textbooks be solved in this manner, but identical problems with different values provided by the user can also be solved. The active server page in this case can be controlled by CGI, JAVA, Visual Basic or lingo.

Going back to FIG. 3, an additional object that is associated with the present invention is the exposition object 240. Stored therein are expositions and tutorials relating to particular categories and specific topics indexed in the subject object 210. Each exposition has an index code taken from the subject object 210. Not every category or topic in the subject index necessarily has an exposition associated with it, but each exposition does have a category or topic associated with it. These expositions can be referred to by users whenever they have trouble understanding various categories or topics of interest. For example, if a user is having trouble understanding the topic of "Operations on Sets" the web site program or computer program is capable of searching the exposition object 240 for an exposition on "Operations on Sets" and delivering same to the user.

Figure 5A:
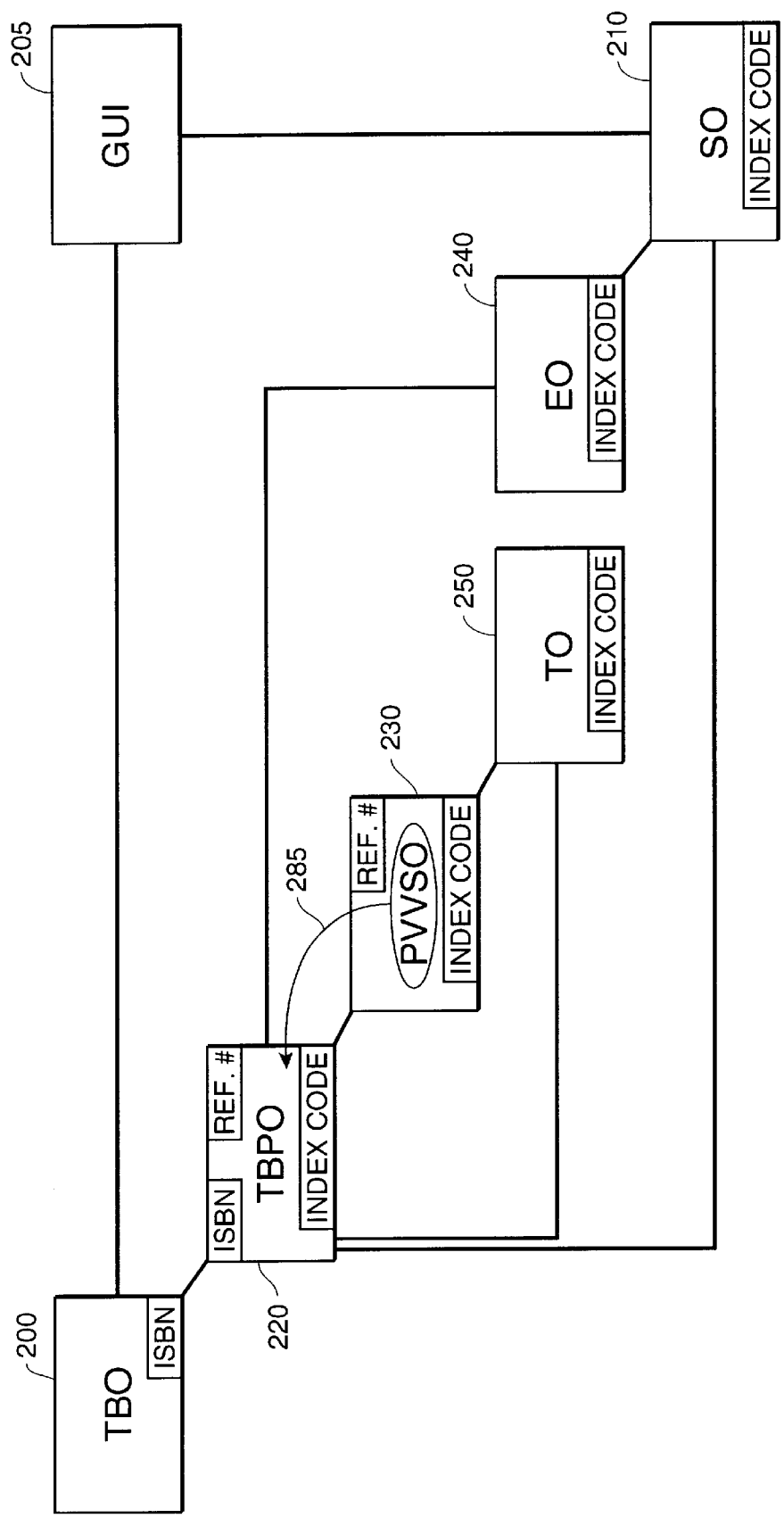
FIG. 5A is a schematic representation of an example of the linkable pathways between objects according to one embodiment of the invention.

The schematic illustrated in FIG. 5A shows an example of the way that the web site program or computer program can link the objects described herein. Each record in the textbook object 200 comprises an identifier, such as an ISBN number, and each record in the textbook problem object 220 also contains an identifier, such as an ISBN number. Each textbook problem record can contain a reference number, as can each problem variable value set record if the problem variable value set object 230 is a stand-alone object. Reference numbers, however, are not needed if the PVVSO 230 is not a stand-alone object but is part of the textbook problem object 220.

The web site program or computer program can link a specific record from the textbook object 200 with a specific record from the textbook problem object 220 by, for example, recognizing like ISBN numbers. Thus, when a user requests a solution to a problem from a specific textbook, the web site program or computer program searches the textbook object 200 for the textbook, identifies the ISBN number, and then searches only those records in the textbook problem object 220 containing a like ISBN number.

The exact record of the problem is identified by matching information supplied by the user with the identifiers associated with each problem record in the textbook problem object 220, such as problem number, problem letter, category, etc. If the problem is a public domain problem, the solution to the problem will include the exact problem statement from the textbook in addition to the solution itself.

The web site program or computer program can link the textbook problem object 220 with the problem variable value set object 230, the template object 250, the exposition object 240, and the subject object 210. Thus, once a record is identified and retrieved from the textbook problem object 220, the web site program or computer program can provide the user with one of three things: 1) the solution to the problem; 2) an exposition relating to a topic with which the problem is most closely associated; or 3) a link to the subject index, and to the particular topic in the subject index so that the user can see the various topics and categories around that particular topic.

If the user is interested in viewing the solution to the problem, the web site program or computer program searches the problem variable value set object 230 for a record associated with that particular problem. The record in the problem variable value set object 230 contains a problem variable value set containing value elements taken from the problem. Alternatively, as depicted by arrow 285, the problem variable value set can be a part of the textbook problem object 220, with each record in the textbook problem object 220 containing a problem variable value set. If the PVVSO 230 is a stand-alone object, each record in the PVVSO 230 and the textbook problem object 220 contains a reference number. The reference number for each record in the textbook problem object 220 is a unique number and is identical to a reference number for a record in the PVVSO 230. Thus, each record in the textbook problem object 220 corresponds with one record in the PVVSO 230, and the web site program or computer program can link the two by identifying like reference numbers. If the PVVSO 230 is not stand-alone but is part of the textbook problem object 220, reference numbers are not needed because each problem variable value set is structurally linked by being a part of a record of a problem in the textbook problem object 220.

Once the web site program or computer program has identified the problem variable value set associated with the textbook problem requested by the user, it searches the template object 250 for a record of a template containing an index code identical to the index code associated with the record of the problem identified in the textbook problem object 220. Each record from the template object 250, i.e., each template, contains certain variable elements. The web site program or computer program replaces the variable elements with each one of the value elements from the problem variable value set and delivers or uploads the interim solution to the user's computer, and the user can view it on his/her computer screen.

If the user is interested in a tutorial or exposition of a topic of interest rather than or along with a solution to a problem, the user can find the exposition in one of two ways. The user can either link to an exposition by searching for a problem as described above and then requesting an exposition rather than or along with a solution, or the user can search the subject index 210 for a topic of interest. In the former case, the web site program or computer program will, after identifying the record of the problem in the textbook problem object 220, search the exposition object 240 for a record having an identical index code. As described above, each exposition contains a unique index code, and the web site program or computer program is capable of searching the exposition object 240, identifying an index code and matching it to the index code of the record of the problem contained in the textbook problem object 220. Once the appropriate exposition is identified by the web site program or computer program, it is then delivered or uploaded onto the user's computer, and the user can view it on his/her computer screen.

Alternatively, the user can search for an exposition by first searching the subject object 210 for the category or topic which he/she is interested in. The GUI 205 can provide the user with a query regarding the field of endeavor, such as math, chemistry, physics, physical science, engineering, biology, biochemistry, molecular biology, pharmacology, and computer science, followed by other queries with more specific information provided by the user. The web site program or computer program can also perform a Boolean search using various terms provided by the user. Finally, the user can view the entire index of a given field.

Once the user has found the particular topic, which he/she is interested in learning more about, the web site program or computer program can search the exposition object 240 for a record of an exposition containing an identical index code. After the relevant exposition is identified, the web site program or computer program can deliver or upload the exposition onto the user's computer, and the user can view it on his/her computer screen.

Figure 5B:
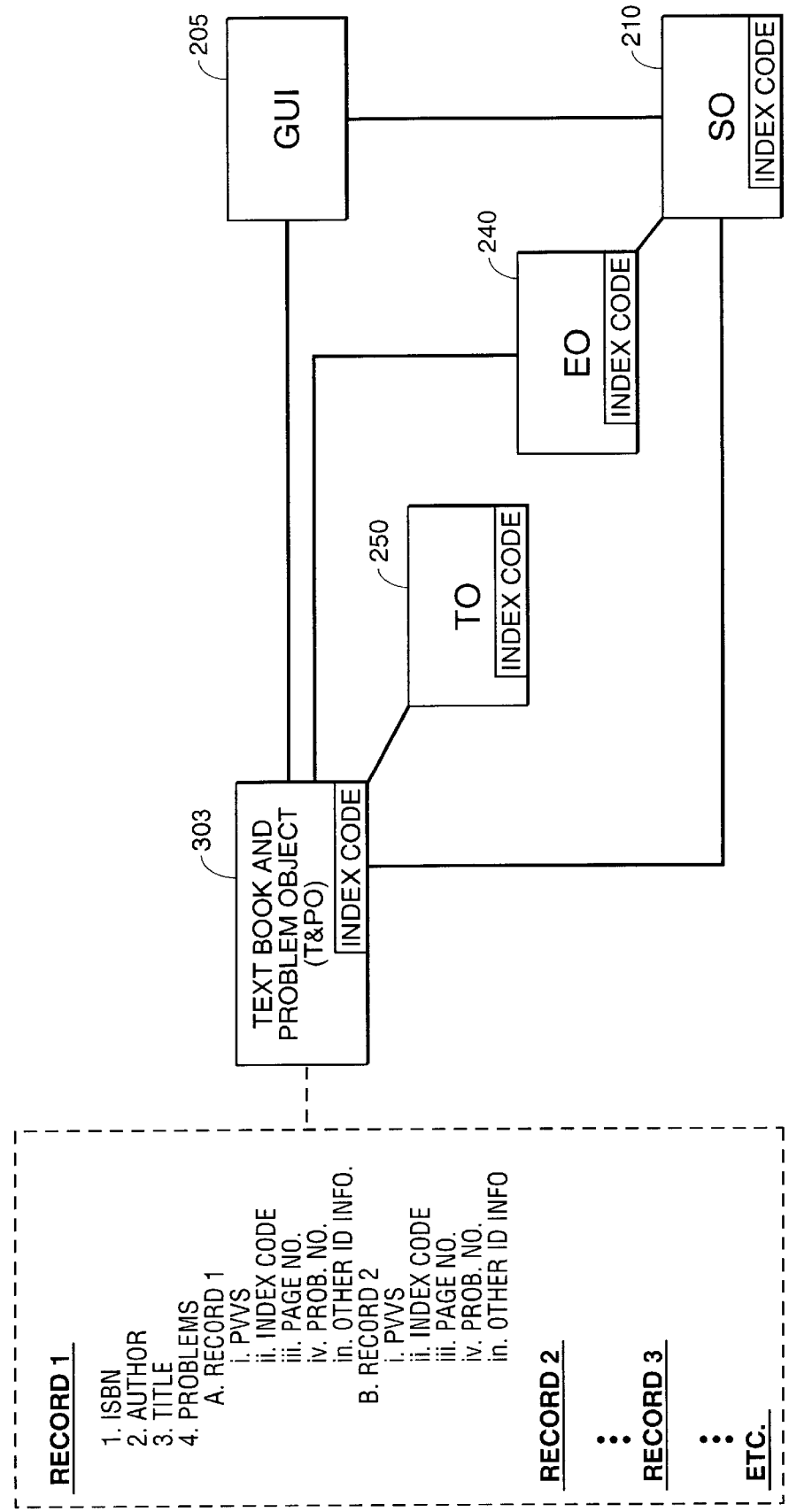
FIG. 5B is a schematic representation of another example of the linkable pathways between objects according to another embodiment of the invention.

In another embodiment of the invention shown in FIG. 5B, the textbook object and problem object have been converged into one object 303. In this embodiment, the textbook object contains one or more records of textbooks, preferably up to 100 records, more preferably up to 1000 records, more preferably up to 10,000 records, more preferably up to 100,000 records, more preferably up to 1,000,000 records, more preferably up to 10,000,000 or more records. Each textbook record can include such identifying information as the textbook's ISBN number, its author, its title, etc. Each record will also contain records of each problem found in that textbook. Thus, when a user conducts a search, the web site program or computer program searches only those records of problems found within the record of the textbook requested. This can decrease the amount of time it takes to retrieve a record of the problem and its solution(s).

One of the benefits of this embodiment is that it reduces the amount of data that needs to be stored by making it unnecessary to attach a public domain indicator to each public domain problem as described hereinafter. Instead, each textbook record will contain a public domain indicator rather than each problem, and there are far fewer textbooks than there are problems, thus reducing the amount of data to be stored.

Using this approach, when a user requests a search for a problem type rather than for a specific problem (see FIG. 8 and description thereof), the web site program or computer program will search the public domain textbooks, i.e. those textbooks with public domain indicators, for a public domain problem before it searches the non-public domain textbooks.

Figure 6A:
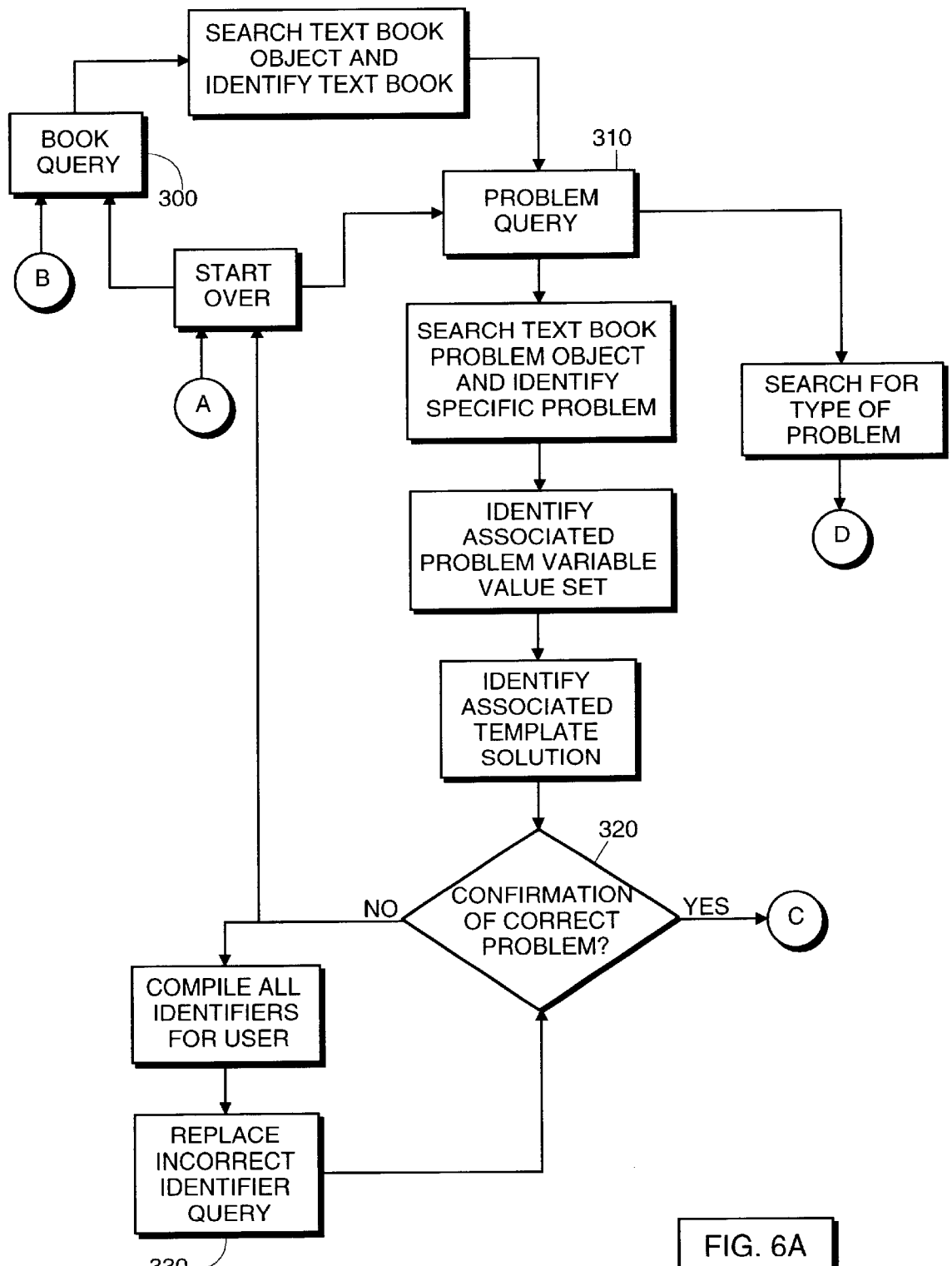
FIGS. 6A and 6B are connected flowcharts showing an example of a sequence of steps performed by a computer upon receiving a request to provide a solution to a given specific problem or to a type of problem in accordance with one embodiment of the invention.
Figure 6B:
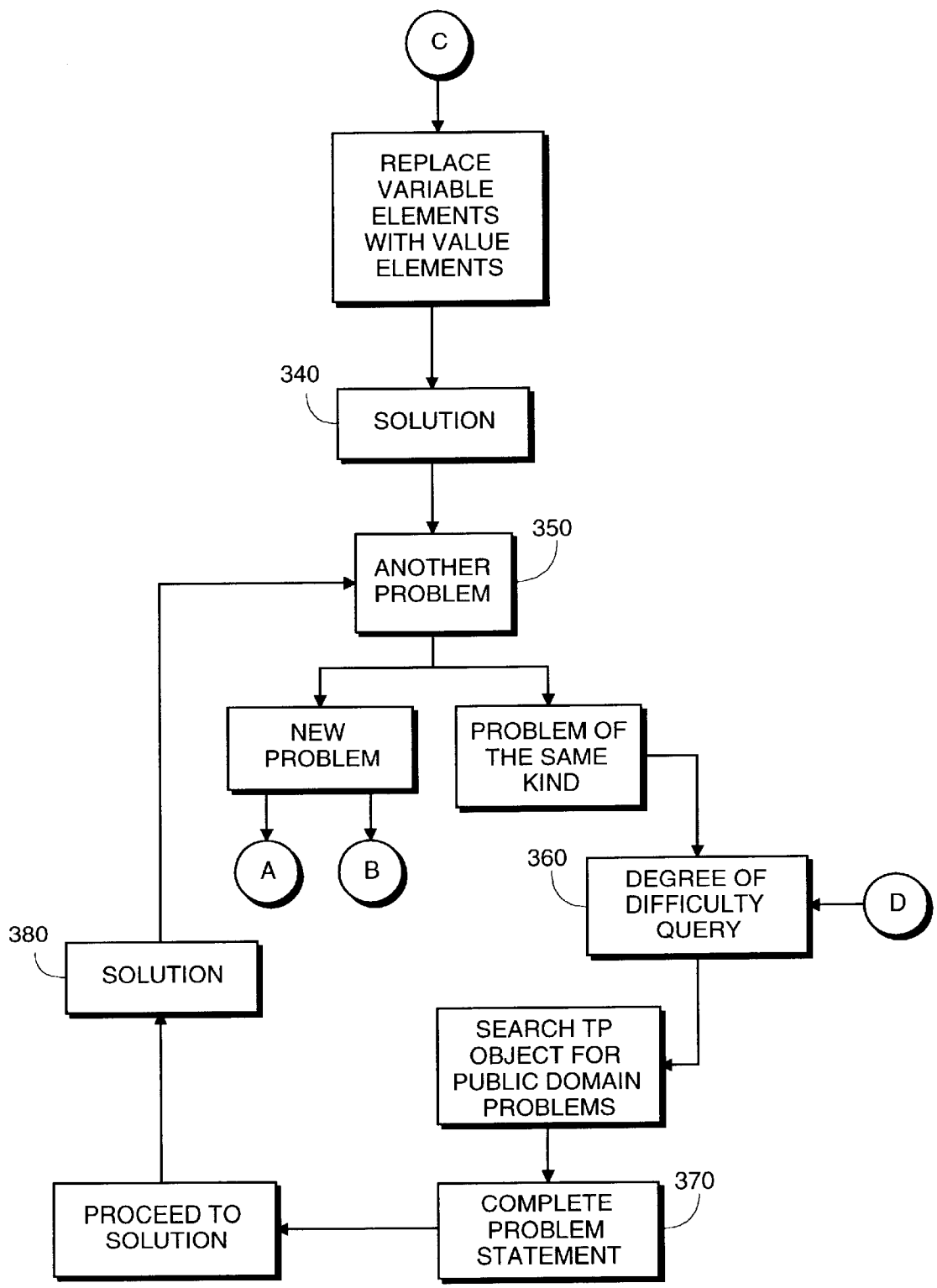

In one example, the flowchart shown in FIGS. 6A and 6B show the steps performed in delivering a solution to a problem in more detail. A graphical user interface provides the user with certain queries that are used by the computer to identify the problem to which the user is requesting a solution. The user provides certain identifying features of a book in the book query 300. These identifying features can be any one or more of the following: the category or field of endeavor; the ISBN number of the textbook in which the problem resides; the author of the textbook; the copyright date of the textbook; the publisher of the textbook; the title of the textbook; or any other identifying feature. The user also provides certain identifying features of the particular problem to which the user wants the solution in a problem query. These identifying features can be any one or more of the following: the page number of the textbook; the problem number; the problem letter; the subcategory, the problem statement (public domain problems), public domain identifier, or any other identifying feature. The book query and the problem query can be displayed on the same computer screen or web page.

Once the aforementioned information is provided by the user, the web site program or computer program searches the textbook object 200 for a record of the appropriate textbook, and then searches the textbook problem object 220 for all problems in that textbook and identifies the record of the problem. If the user is searching for a solution to that problem, the web site program or computer program will identify the problem variable value set associated with that problem and identify the appropriate template solution associated with that problem by matching like index codes as explained above, and provide the user with a confirmation message 320 describing certain characteristics of the problem.

If the user is not satisfied that the web site program or computer program has found the correct problem, the user can so indicate. If more than one problem is found that satisfies the user's queries, the web site program or computer program or incomplete field entry handler associated with either can cause the user's computer to display a selection of problems that fit the description provided by the user, the user can then chose the correct problem. Alternatively, the user can start all over by returning to the book query 300 or can replace an incorrect identifier 330. The web site program or computer program will provide the user with a compilation of all of the identifiers that the user had previously provided in steps 300 and 310 so that the user can make the appropriate corrections.

Once the correct problem is confirmed in step 320, the web site program or computer program will replace each of the variable elements in the template that is retrieved with the appropriate value element in the problem variable value set that was retrieved. The value elements in the problem variable value set are stored such that the web site program or computer program will be able to replace a variable element with the correct corresponding value element. This is accomplished by storing a value element as a function of a variable element so that each value element corresponds with the appropriate variable element in a template solution. As shown in FIG. 6B, the web site program or computer program will then cause the web site servers or the personal computer itself to upload or deliver the solution 340 to the user's computer, and the user is able to then view the solution on his/her screen.

If the user wants to view another problem 350, the user returns to the beginning for another session. The information from the prior session is retained in memory and the user can replace any of the identifying information relating to the textbook 300 or the problem 310.

If instead, the user wants to see another problem of the same kind, the web site program or computer program provides the user with a Degree of Difficulty query 360. At this step, the user can ask to view more difficult or less difficult problems of the same type. The web site program or computer program will search the textbook problem object 220 for public domain problems of the same type. This can be accomplished because each record of a problem in the textbook problem object 220 can also have a public domain indicator to indicate whether a problem is a public domain problem. Thus, the web site program or computer program searches for 1) problem records in the textbook problem object 220 having index codes identical to the index code of the previous problem, and 2) a public domain problem indicator. Each public domain problem record will further include an actual statement of the problem. The actual statement of the problem can be used as the public domain indicator.

If the degree of difficulty requested is different from the previous problem, the web site program or computer program will search for public domain problems having an index code identical to the previous problem's index code except that the level of difficulty indicator, which can be a part of the index code, will be different.

Once the appropriate problem is found, the complete problem statement 370 is delivered/uploaded to the user's computer, and the user can view it on his/her computer screen. The final step is to view the solution to the problem 380. Again, the solution is formed by replacing the variable elements of the template with the value elements of the problem variable value set as described above.

Figure 7A:
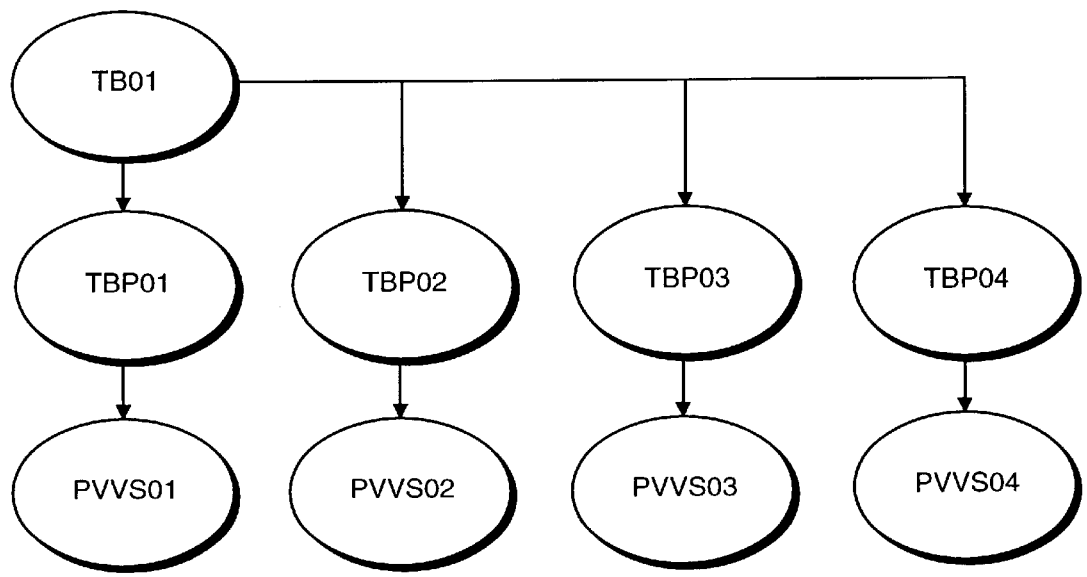
FIGS. 7A–7D are a schematic representation of a matrix of like problems and their associated textbook (7A), template solution (7B), exposition (7C), and subject (7D).
Figure 7B:
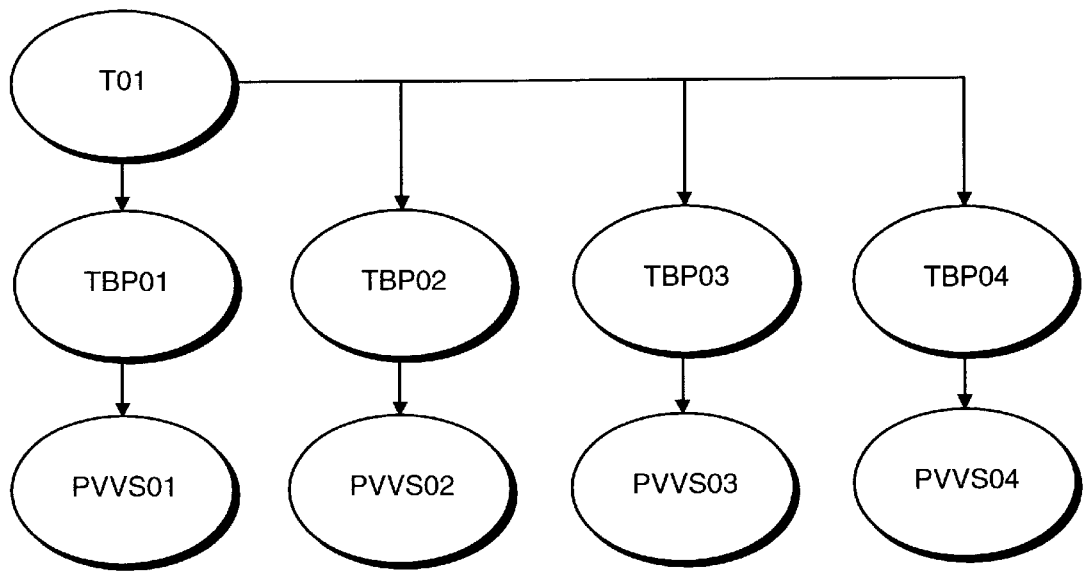
Figure 7C:
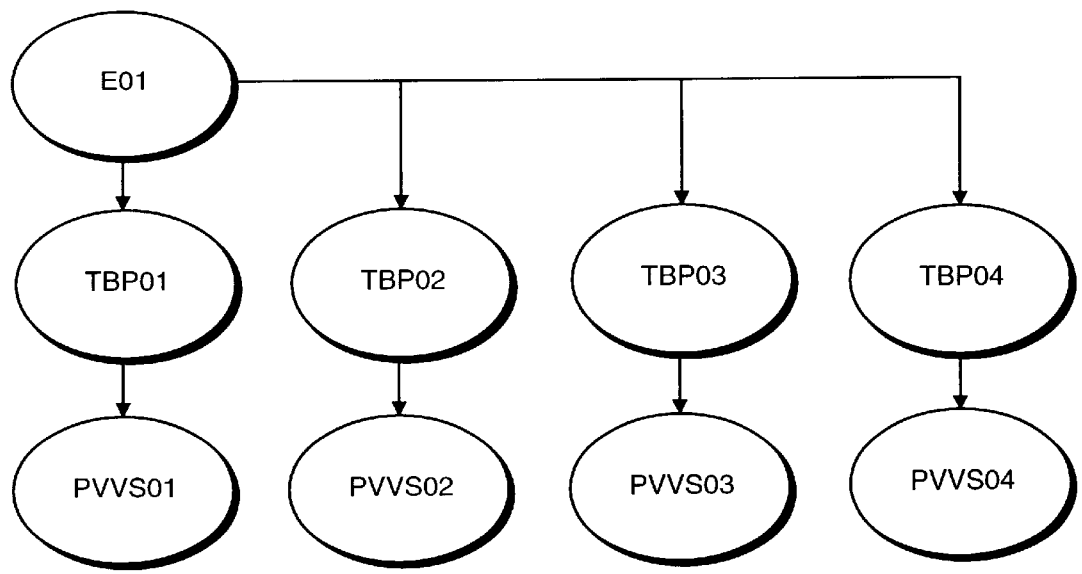
Figure 7D:
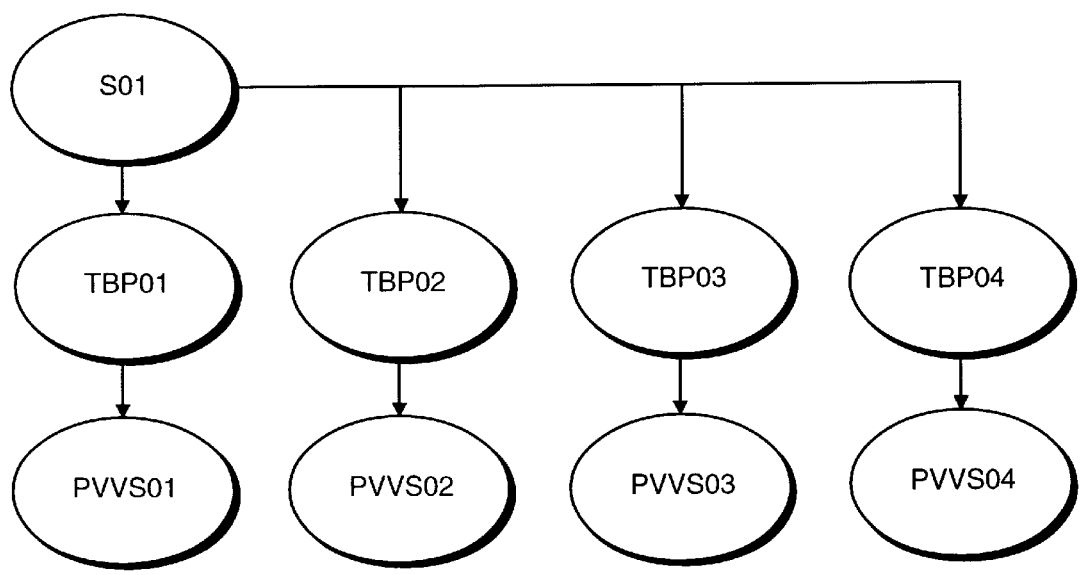

FIGS. 7A–7B show that the records stored in the textbook, template, exposition, and subject objects contain redundancies and can be used in association with a plurality of problems. FIG. 7A shows that one record from a textbook object, i.e., one textbook, can be linked with a plurality of records from the textbook problem object (and the problem variable value set object, if the PVVSO is separate from the textbook problem object). FIG. 7B shows that one record from the template object, i.e., one template, can be linked with, i.e., has the same index code as, a plurality of records from the textbook problem object. Thus, one template solution can be used to solve potentially hundreds or thousands of different problems from different textbooks. FIG. 7C shows that one record from the exposition object, i.e., one exposition on a specific topic, can be linked with, i.e., has the same index code as, a plurality of records from the textbook problem object. FIG. 7D shows that one record from the subject object, i.e. one category or topic, can be linked with, i.e., has the same index code as, a plurality of records from the textbook problem object.

Figures 8, 8A:
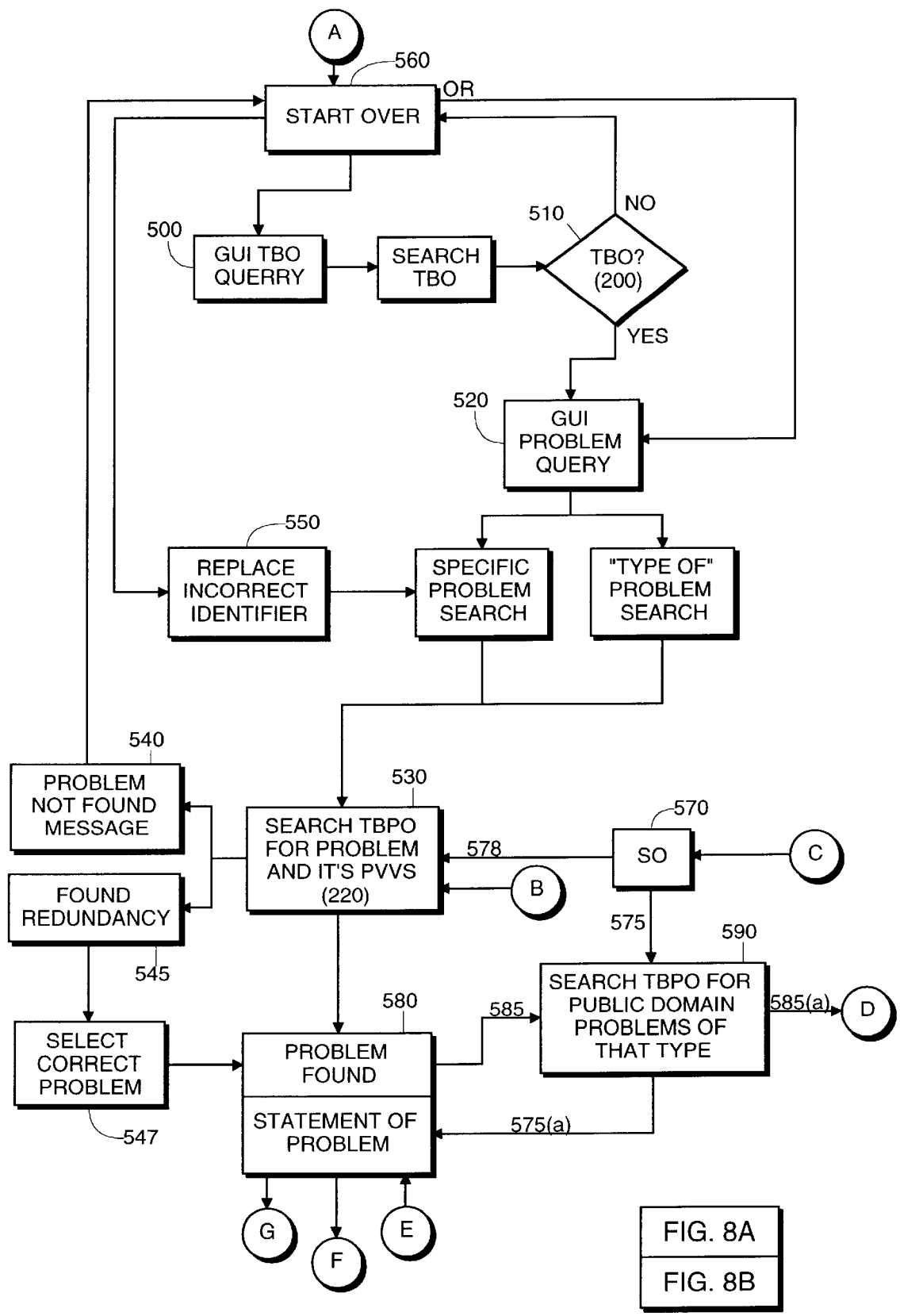
FIGS. 8A and 8B are connected flow charts showing a sequence of steps performed by a computer upon receiving a request to provide a solution to a given specific problem or to a type of problem in accordance with one embodiment of the invention.
Figure 8B:
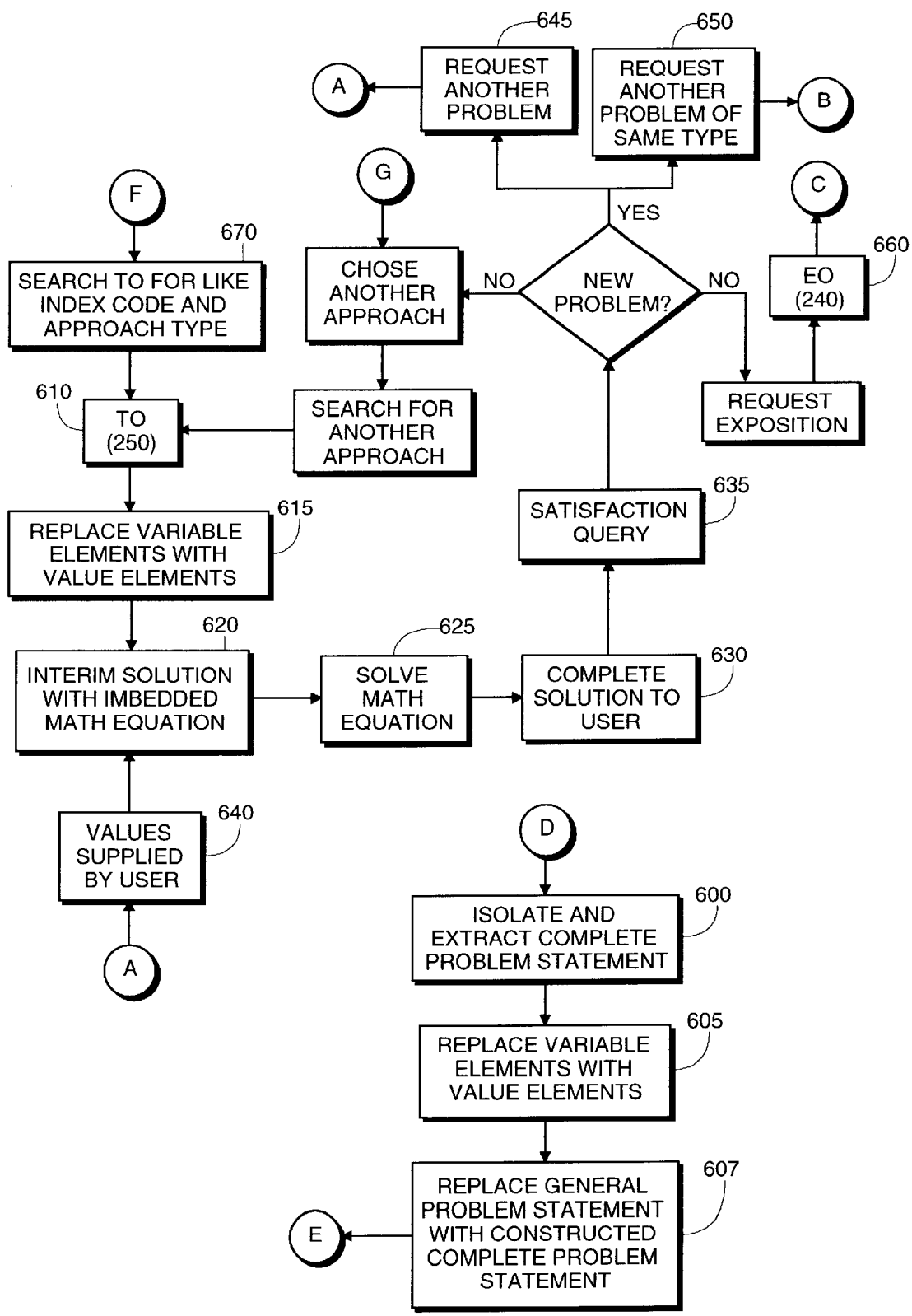

FIGS. 8A and 8B are a flow chart showing another example of a method and system for providing solutions to given problems. FIG. 8A starts with a graphical user interface (GUI) which provides the user with a textbook query 500. The textbook query can take the form of empty data input fields with questions for identifying the correct textbook. These questions can call for the author of the ISBN number of the textbook, the author of the textbook, the title of the textbook, the copyright date, the publisher, etc. Alternatively, the textbook query 500 can ask the user for the user's personal information such as the user's school, class, and teacher, which can be provided either through empty input fields in the GUI or through drop down menus starting with the student's state, city, school etc.

Figure 12:
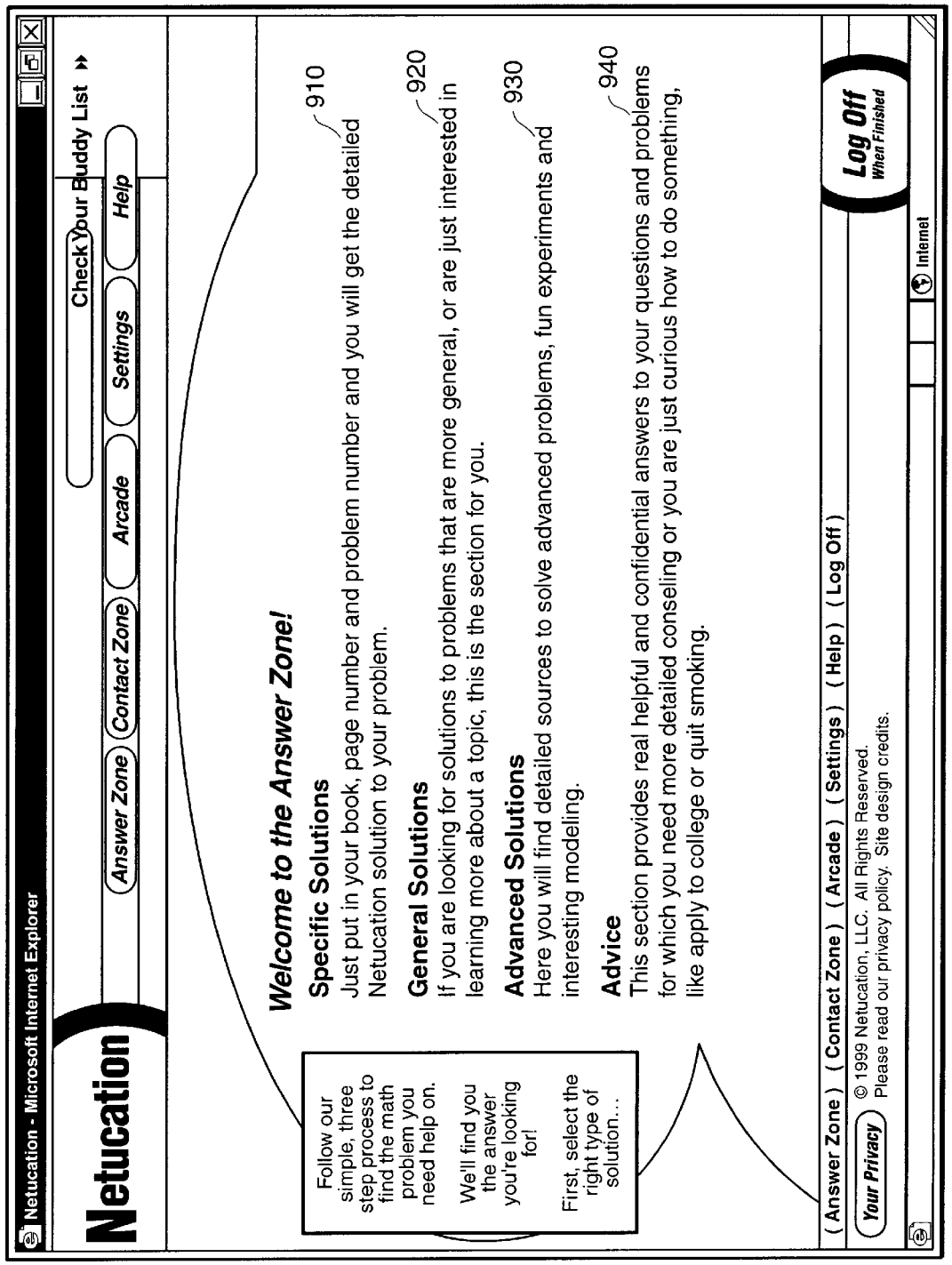
FIG. 12 is an example of a screen display depicting examples of choices provided to a user/student with respect to solutions to specific problems and instructions on various topics.

Another form of identifying textbooks is by storing in computer readable form and in semi-permanent records, those textbooks that the particular user has chosen in the past. Thus, the student can chose from among those textbooks that he/she has used before. An example of such a method and system is depicted in FIG. 12, where the student selects the textbook from a list of those chosen by that user in the past. The user can add other textbooks to this list by employing the methods described above, or the user can delete textbooks from this list.

Once the information is supplied by the user, the web site program or computer program searches 510 the textbook object 200. If the requested textbook is not found in the textbook object, the user must start all over by providing new information or replacing incorrect information.

Figure 13:
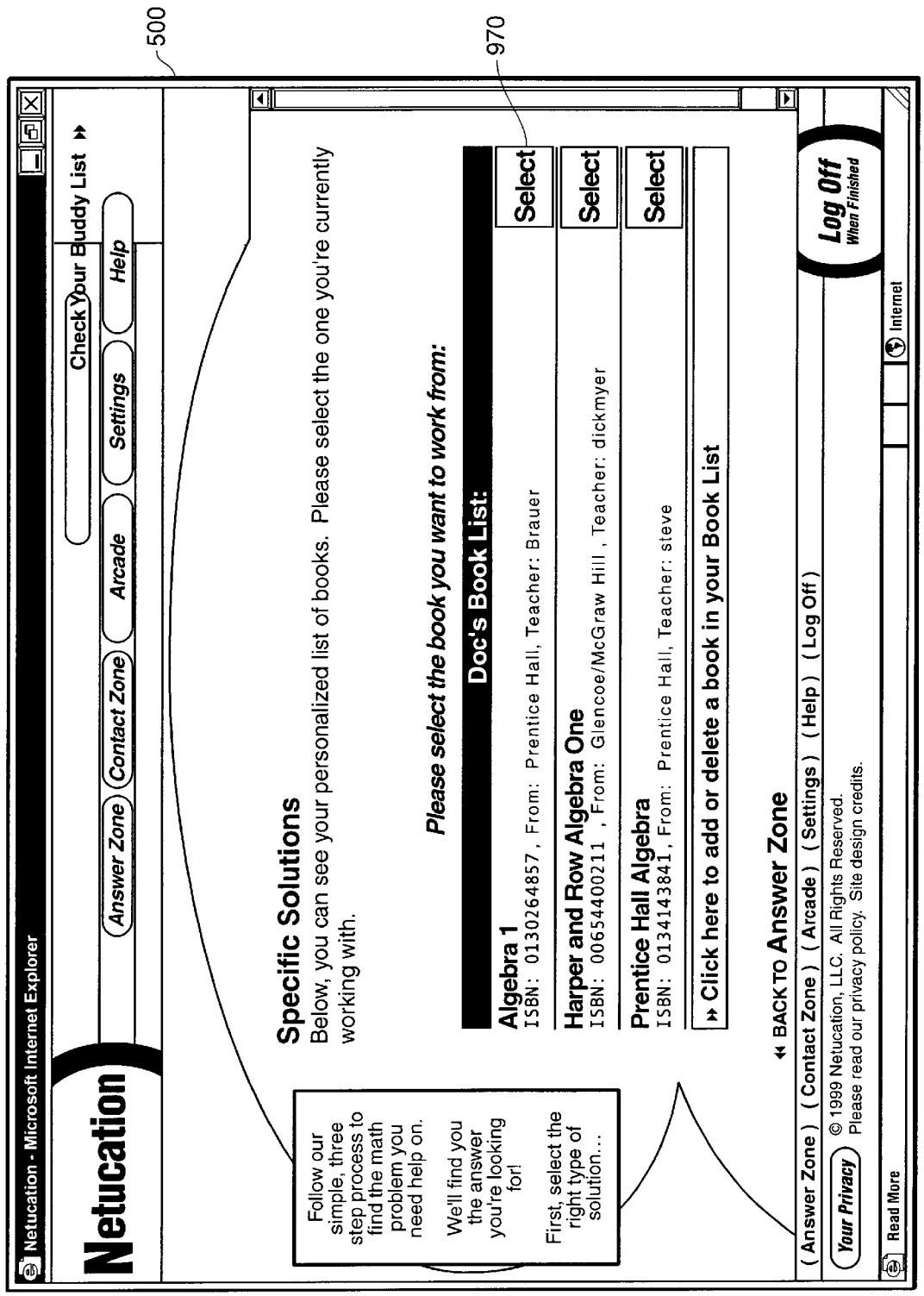
FIG. 13 is an example of a screen display depicting a stored book list of a specific user.

If the textbook is found, the web site program or computer program calls up a problem query GUI 520 and delivers it to the user's computer. The problem query GUI 520 can comprise data input fields that request the identifying information of a specific problem from the user. Those data input fields can include questions such as the page in the textbook on which the problem is found, the problem number, the problem letter, the category in the textbook in which the problem is found, etc. These input fields can include drop down menus or lists. FIG. 13 provides an example of a problem query GUI 520. In that example, data input fields include the page number of the problem, the problem number, and a drop down list asks for the category of the problem. This list may not be required if the problem resides on a page that has only one category of problems or where only one category includes a problem having that problem number.

Once the data is received by the web servers or the personal computer, the web site program or computer program searches the textbook problem object 220 for the problem from that textbook. If the problem is not found, a message 540 is transmitted to the user's computer (online system) and/or displayed on the user's computer screen indicating that the problem was not found. The user can then start over from the beginning 560, or replace an incorrect identifier 550 in a list of all of the identifiers provided by the user previously. The search is then conducted again as described before.

If the web site program or computer program finds a redundancy 545, i.e. more than one problem is associated with the user's queries, identifying information about each problem is transmitted to the user's computer (online system) and/or displayed on the user's computer screen, and the user is asked to select the correct problem 547. Once the user selects the correct problem, the web site program or computer program causes the user's computer screen to display a message 580 indicating that the problem is found.

Once the correct problem is found and identified, the web site program or computer program continues in step 585 to search 590 the textbook problem object 220 for public domain problems having the same index code as the one being sought by the user. If such a public domain problem exists, the web site program or computer program can retrieve 585(*a*) the record of that problem.

In FIG. 8B, once the record of the problem is retrieved, the web site program or computer program can isolate and extract 600 the complete problem statement from that record.

The problem statement of any problem contains values that are dispensable and replaceable with other values without changing the character of the problem. Thus, the complete statement of the problem can be stored in such a manner that the constant values in the problem statement are extracted and replaced with variable place-holders. Alternatively, the constant values can be tagged so that they are recognizable to the web site program or computer program as values that are replaceable with other values from problem variable value sets associated with a problem having the same index code as the particular public domain problem.

The web site program or computer program then searches for the variable place holders (or tagged constants if tagging is the method used). It then replaces 605 those place holders (or tagged constants) with the value elements from the problem variable value set associated with the problem that the user wants a solution to. Thus, a complete statement of the problem can be constructed for those types of problems that have counterparts in the public domain. The web site program or computer program then replaces 607 the general statement of the problem associated with the problem being queried with the complete statement that was constructed using a public domain problem.

Moreover, if the problem being sought by the user is itself a public domain problem, the problem statement will include the exact statement of the problem from the textbook. Thus, the solution that is delivered to the student includes the exact problem statement.

If the web site program or computer program cannot find a public domain problem in step 590, then it moves on to the step of searching 610 the template object 250 for a template solution to the problem. The search is accomplished by searching for an index code that is identical to the index code of the problem. Each problem will have only one template solution associated with it.

Alternatively, each problem can have two, three, four, five or more template solutions associated with it. Each template solution represents one mechanical approach or method of solving a problem, wherein each approach or method is associated with a particular way of thinking or conceptualizing. Thus, if a user does not understand one approach, he or she can request to view another approach. If a user is prone to comprehend a particular problem solving approach more readily than other approaches, he or she may choose this approach as a default for further problem solutions.

For template solutions that have counterparts with different approaches, the different approaches have identical index codes except for additional identifiers, either within the index code or as part of a separate field within the record of the template, which specify a particular approach or method.

After the web site program or computer program has found the record of the appropriate template solution and has identified the appropriate template, it will replace 615 variable elements imbedded within the template solution with value elements taken from the problem variable value set associated with the record of the problem. The following is an example from the field of pre-algebra:

| Problem Statement | PVVS | Template Soltn. | Interim Soltn. |
|---|---|---|---|
| This is a pre- | $a = 4$ | $ax + b = c$ | $4x + 8 = 6$ |
| algebra problem | $b = 8$ | $ax = c - b$ | $4x = 64 - 8$ |
| that asks you to | $c = 64$ | $\underline{ax = c - b}$ | $\underline{4x = 64 - 8}$ |

-continued

| Problem Statement | PVVS | Template Soltn. | Interim Soltn. |
|---|---|---|---|
| solve for x; or if public domain: $4x + 8 = 64$, what is x? | a a | $x = \dfrac{c - b}{a}$ | $x = \dfrac{64 - 8}{4}$ |

The above example excludes written verbal explanations between steps, but each template solution can also include verbal explanations between steps to explain the action that was taken in the previous step or the action that will take place in the following step.

After the interim solution 620 has been generated, a calculator solves the equation 625 imbedded in the interim solution. In the above example, the equation to be solved would be 64 minus 8, divided by 4, and the solution would be 14. The calculator can be a part of the web site program or computer program, it can be another computer program/application, or it can be associated with another program/application, such as Shockwave™.

Alternatively, the calculator can solve the mathematical equations imbedded within each step of the solution. Thus, additional steps to the solution could be added wherein the mathematical equation imbedded in the previous step of the solution would be solved. In the above example, there would be no interim solution, but a complete solution including the following steps:

$4x+8=64$  Step 1

$4x=64-8$  Step 2

$4x=56$  Step 3

$4x/4=56/4$  Step 4

$x=14$  Step 5

Once all of the above steps are accomplished, the solution to the problem is delivered to the user 630. The entire solution can be delivered at once, or the solution can be delivered in a series of steps with the user prompting the web site program or computer program to deliver the next step.

Solutions can also be delivered with animation, wherein the values and variables are not static but move around on the screen. In step 2 of the above example, the user would see the value "8" be transported from the left side of the equation to the right side of the equation. This is accomplished using such applications/software as Shockwave™. The user can control this animation, or movie, using standard Shockwave™ features.

At the end of the solution, the satisfaction query 635 asks the user if he/she is satisfied with the solution to the problem. If the user is not satisfied and still does not understand how to solve the problem, a message will appear asking the user to choose another presentation type or approach to problem solving 670 based on ways of thinking and conceptualizing. The web site program or computer program will then search the template object 250 for another template solution to the problem, wherein the template solution provides another approach to solving that same problem.

Alternatively, the user can request a solution to a whole new problem 650, another problem of the same type 645 chosen by the web site program or computer program, or an exposition 660 relating to the type of problem just solved. If the user requests a solution to a whole new problem, the whole process will start over again 560, either at the textbook object query 500 or problem query 520 based on the user's preference.

Alternatively, the user can insert different values 640 into the problem most recently solved, or which is still on the user's screen display. This step can be carried out at any time after the solution is delivered to the user's computer screen. This can be done by providing the user with value element modification fields, through which the user can insert different values to the existing problem and therefore provide interactive input. For example, in FIG. 4, the solution screen includes an interactive portion 450. In the interactive portion 450, the user can alter the values associated with variables a, b, and c, thus modifying the solution to the problem. The solutions can be modified on the fly using software/applications such as Shockwave™, which can perform calculations and generate new solutions virtually instantaneously.

After the solution to a problem is delivered to the user, a query can be sent to the user's computer, asking whether the user would like to see another problem of the same type. FIG. 17 shows an example of a message 1100 asking whether the user's question about this math problem has been answered. The user can, at this point, request to see another problem of the same type by clicking on the statement, "If no, you can try another problem of the same type." The web site program or computer program will then search 530 the textbook problem object for another problem having the same index code as the previous problem. The web site program or computer program can search for problems in the following order of priority: 1) public domain problems; 2) non-public domain problems. Moreover, information about the user can be stored either in the memory of the user's personal computer or in the memory of servers or computers serving the web site. Such information can include the problems that the user has viewed in the past. The web site program or computer program can use this information to deliver only those problems that a particular user has not yet viewed so that the user is always supplied with problems that are new to him or her.

Alternatively, the user can search for problems of the same type at step 520 before having viewed the solution to any problem. The user can supply all relevant identifying information about a specific problem from a textbook at step 520 and request that a problem of the same type be found rather than the solution to that particular problem. The web site program or computer program will then find that particular problem (steps 530 and 580) and then search the textbook problem object for a public domain problem of that type 590.

Once a problem of the same type is found, the statement of that problem (public domain problems) is delivered to the user's computer. If the problem is not a public domain problem, then the web site program or computer program will go through steps 590, 600, 605, and 607 to match a public domain problem to the retrieved problem and to replace the problem statement as described earlier. In any case, the user is supplied with a problem that contains a complete problem statement, and the user can attempt to solve the problem on his or her own before viewing the solution thereto.

The user can also search the subject index directly 570 and chose a subject from which to pull a problem. The web site program or computer program will first directly search 575 the textbook problem object 590 for a public domain problem having a like index code, and retrieve the statement of the problem 575(a). As previously described, the web site program or computer program will then search 610 the template object 250 for a template with a like index code, and replace 615 all variable elements in the template with value elements taken from the problem variable value set associated with that problem. The problem statement, however, will be delivered first to give the user an opportunity to solve the problem on his or her own before viewing the solution thereto.

If the user has already viewed all of the public domain problems, then the web site program or computer program will search 578 the textbook problem object for non-public domain problems 530. Once a non-public domain problem is found, steps 585, 590, 585(*a*), 600, 605, and 607 will be performed to generate a specific problem statement. The steps described above will then be performed to deliver the problem statement to the user's computer followed by the solution to the problem.

The user can also request to read an exposition/tutorial 660 regarding the area or field of the problem. The web site program or computer program will search for an exposition/tutorial that has the same index code as the problem that the user last viewed the solution to. Once the exposition/tutorial is found, the web site program or computer program will deliver that exposition/tutorial to the user's computer.

In an alternative embodiment, as described with respect to FIG. 5B, the textbook object and the textbook problem object are combined. In such an embodiment, the web site program or computer program would, in step 510, search the textbook and problem object 303 rather than the textbook object 200 for the requested textbook. The step of searching 530 the textbook problem object 220 would also be modified to search the textbook and problem object 303 instead. Finally, the step of searching the textbook problem object for public domain problems of that type 590, would also be modified to search the textbook and problem object 303 for public domain problems of that type. In this embodiment, when searching for public domain problems, the web site program or computer program would isolate the public domain textbooks and search only the records of problems associated therewith.

Together, the steps shown and described in FIG. 8 provide the user with many different tools with which to find solutions to problems or problem types and to learn more about given topics and areas of learning. Employing these steps, a user can find solutions to specific problems. If a user can find other problems of the same type. A user can find expositions and tutorials relating to a problem or a subject topic area. A user is having difficulty understanding a solution to a problem, he or she can view a different approach to solving the same problem. A user can even change the values of any given problem to any value that he or she chooses, thus generating in real time a completely new problem and solution thereto.

Figure 9:
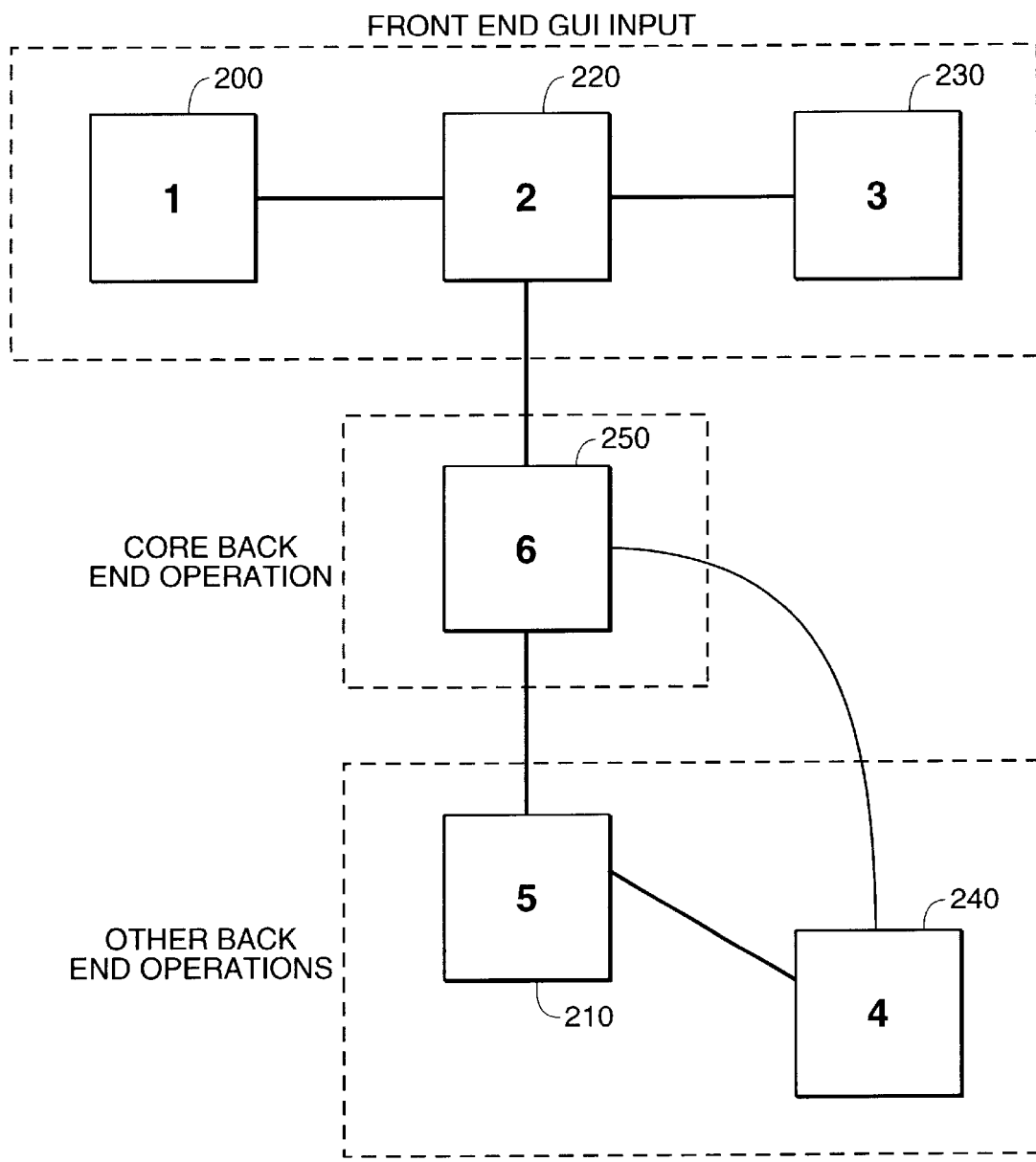
FIG. 9 is a schematic representation of one example of information flow among the objects of FIG. 3.

FIG. 9 shows an example of the different front-end and back-end operations of a system for providing solutions to problems. Through a graphical user interface, the user directly accesses the textbook object 200, the textbook problem object 220, and the problem variable value set object 230, which can either be a stand-alone object or can be part of the textbook problem object 220 as discussed above. Thus, based on the data provided by the user or the prompts given by the user, the web site program or computer program searches the textbook object 200, the textbook problem object 220 and the problem variable value set object 230 to find the problem to which the user wants the solution. The web site program or computer program then searches the template object 250, which is necessary for the core function of generating a solution to a problem. The subject index 210 and the exposition index 240 are other back-end operations that can also be performed.

Therefore, once the book 1 and problem 2 have been identified, the other information relevant to the problem can be referenced., i.e. the numerical values involved in the particular problem 3, the approach to use to solve the problem 6, and the knowledge necessary to solve it. 4. Moreover, each subject area material, found in the exposition object 240, can be taught by theoretical expositions explaining the material.

Figure 10:
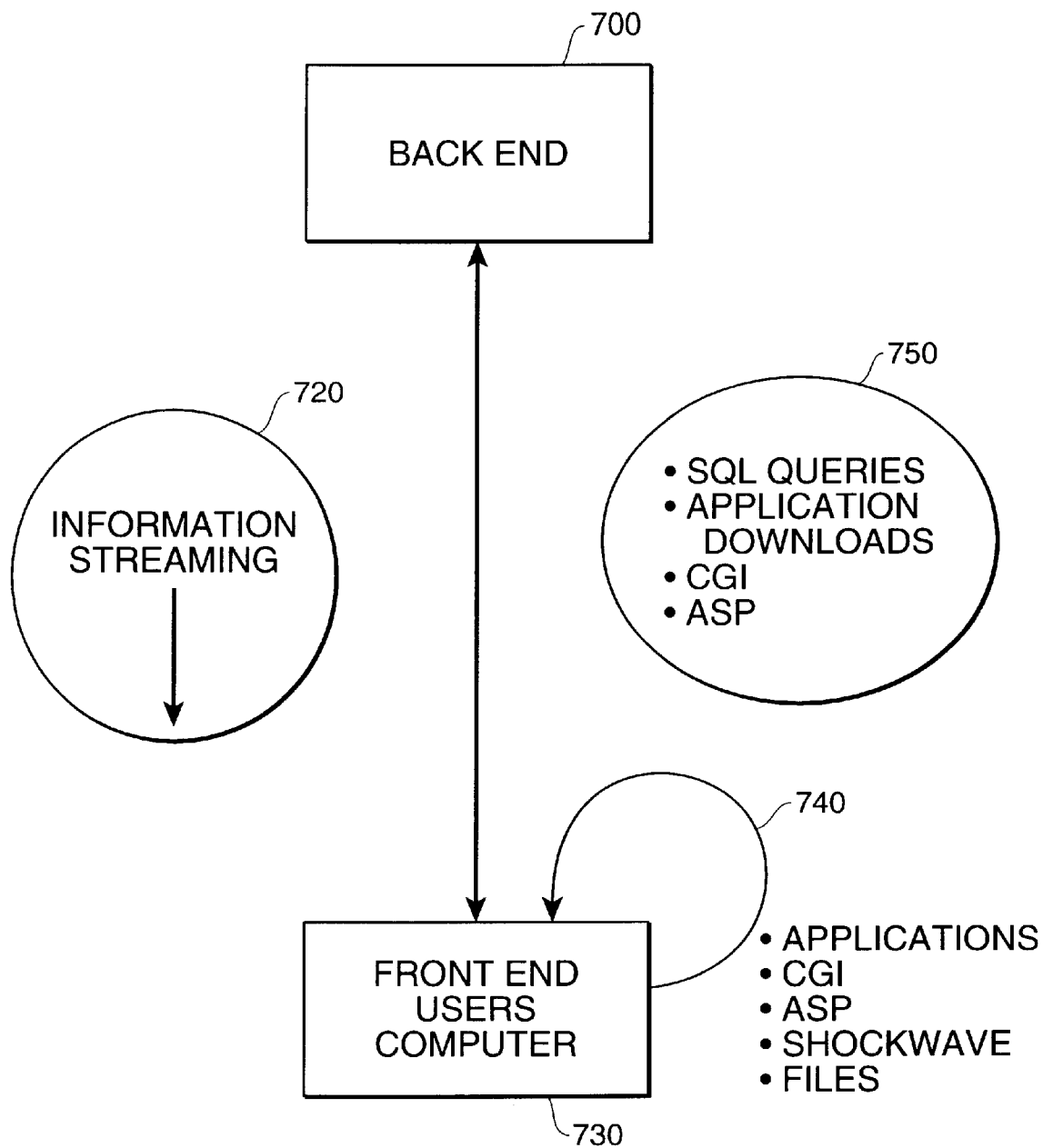
FIG. 10 is a schematic representation of one example of information flow between a back end and a front end of a remote solution delivery system in accordance with one embodiment of the invention.

FIG. 10 is another example of the relationship between the back end, front end, information flow, and application downloads associated with a system for providing solutions to problems. In the back end 700 reside the web site servers which house all of the objects, data structures and data discussed herein as well as the web site program, which may be more than one computer program. The servers can, for example, be SQL servers or Oracle® servers. The front end comprises the user's computer 730. The front end will also comprise the graphical user interface downloaded to the user's web browser from the back end. Information, such as SQL queries, all data, application downloads, CGI, Active Server Pages (ASP), and other computer programs/applications 750 will flow from the back end to the front end, i.e., from the web site servers to the user's computer. For certain elements of interactivity, it will not be necessary to access the web site servers; applications and small files, for example, may be temporarily loaded onto the user's computer 740 or maintained on the user's web browser. Examples of such applications are CGI, Active Server Pages (ASP), and Shockwave™. Along with streaming 720, this will allow rapid responses to the user's actions and requests with little or no delay in downloading time.

Figure 11:
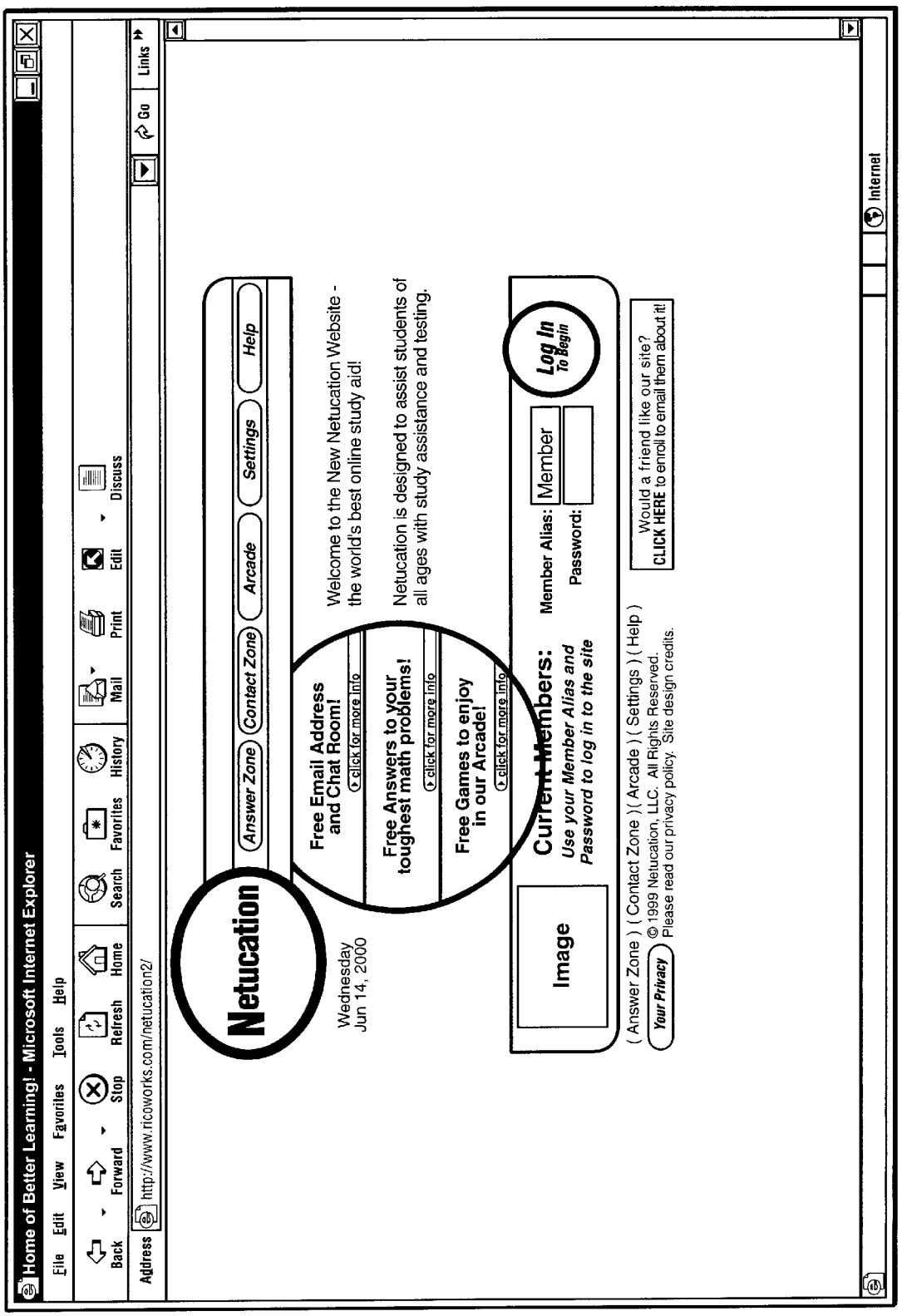
FIG. 11 is an example of a screen display generated by the computer, depicting an example of the home page of an online system.

FIGS. 11–17 show the graphical user interface associated with an embodiment of the invention described herein. FIG. 11 is an example of a home page or log in page where a user can enter his or her member name and password. Information on new users can be stored on the web site's servers. Once a user uses the services provided to obtain solutions to problems, the web site servers can store information about the kinds of problems that the user has requested solutions to or the specific problems that the user has requested solutions to. Thus, when a user requests to see problems of a certain kind, as described in association with FIG. 8, to avoid redundancy, the web site servers will deliver problems that the user has not yet solved. Information about the user's preferences and about the problems he or she has requested to solve can also be stored locally on the user's computer as, for example, cookies, or other types of data files recognizable by the web site program or applications/software associated with the web site.

FIG. 12 shows an example graphical user interface or web page allowing the user to conduct three types of searches 910–930 or to obtain helpful advice 940. The user can search for specific solutions to problems from textbooks 910, for general solutions to types of problems 920, or for advanced solutions 930.

FIG. 13 is an example of a graphical user interface or web page 500, as described in FIG. 8, that a user may advance to if he or she chooses to search for "specific solutions" 910 on the web page depicted in FIG. 12. The books listed in the web page 500 are stored in the web site server along with other information about this particular user. The textbook object 200 can contain records of more than one, more preferably up to 100, more preferably up to 1000, more preferably up to 10,000, more preferably up to 100,000, more preferably up to 1,000,000, more preferably up to 10,000,000, or more textbooks. Once a user requests to view solutions from a textbook, provides the appropriate identifying information for that textbook, and the web site program finds that textbook, that textbook is stored in a computer readable memory associated with that particular user. Thus, the next time the user wants to find solutions, that user will not have to provide identifying information to find the same textbook; he or she can just chose the textbook form a list of textbooks 970 he or she has previously searched for.

This is an important convenience because students often use the same textbooks for an entire school quarter, semester or even year. Therefore, a student will probably need to search through one textbook or set of textbooks for long periods of time before advancing to another textbook. The method and system shown in FIG. 13 provides convenience and decreases the amount of time it takes to search for a solution. Also, a user can delete any textbook that may be on his or her list of textbooks at any time.

Figure 14:
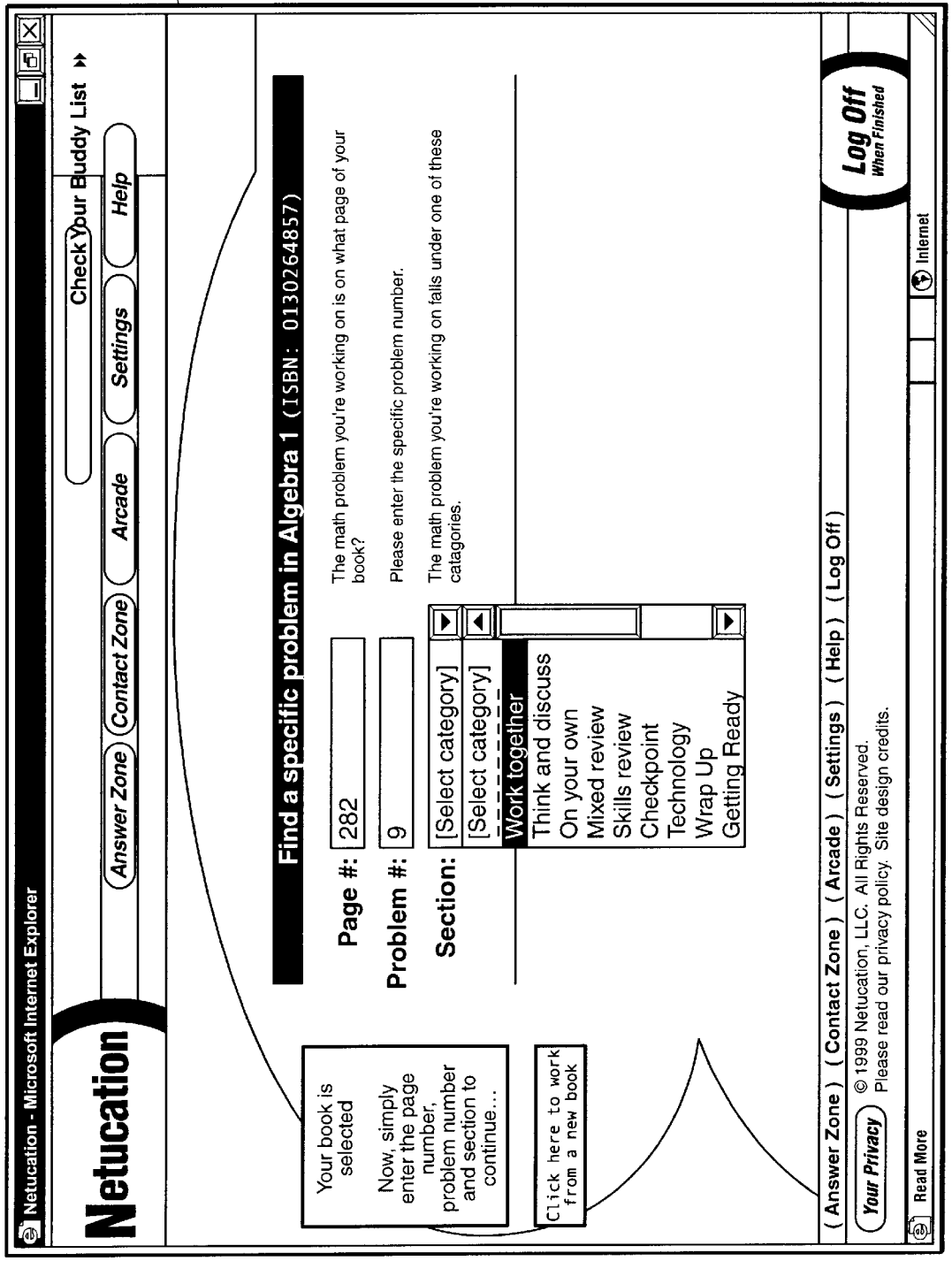
FIG. 14 is an example of a screen display depicting an example of problem identifying input fields for finding the solution to a specific problem.

FIG. 14 is an example of a graphical user interface or web page 520 as described in FIG. 8. The user can provide identifying information about the specific problem, which he or she wants to see the solution to. The web site program will search through all of the records in the textbook problem object 220 having the same textbook ISBN number or other linking reference. Alternatively, each problem from a particular textbook will be stored as a record associated directly with the record of that textbook record in a textbook and problem object 303, as shown in FIG. 5B. In that case, the web site program will search only those records or problems associated with the record of that textbook.

Figure 15:
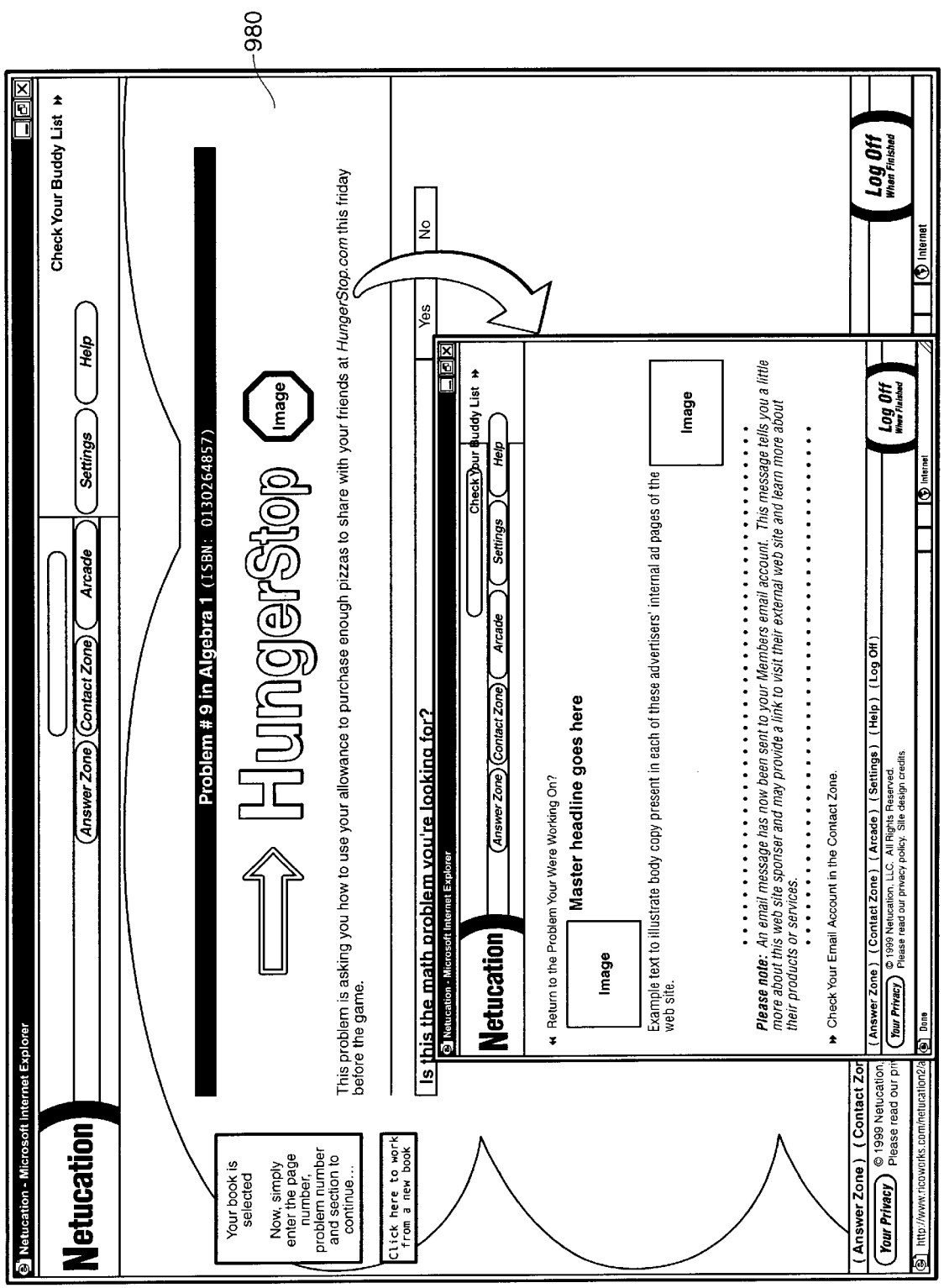
FIG. 15 is an example of a screen display depicting a confirmatory written description or problem statement to confirm that the problem identified by the computer program is the one being sought by the student.

FIG. 15 shows an example of a graphical user interface or web page designed for the purpose of confirming that the web site program or computer program has found the correct problem. The web page includes a generic or general statement of the problem 980. If the problem is a public domain problem, statement 980 would instead be the exact statement of the problem. Also, if the web site program or computer program can find a public domain problem with the same index code as the requested problem, it can generate and deliver to the user an exact statement of the problem. This method of generating exact problem statements is described in steps 585, 590, 600, 605, and 607 of FIG. 8.

Figure 16:
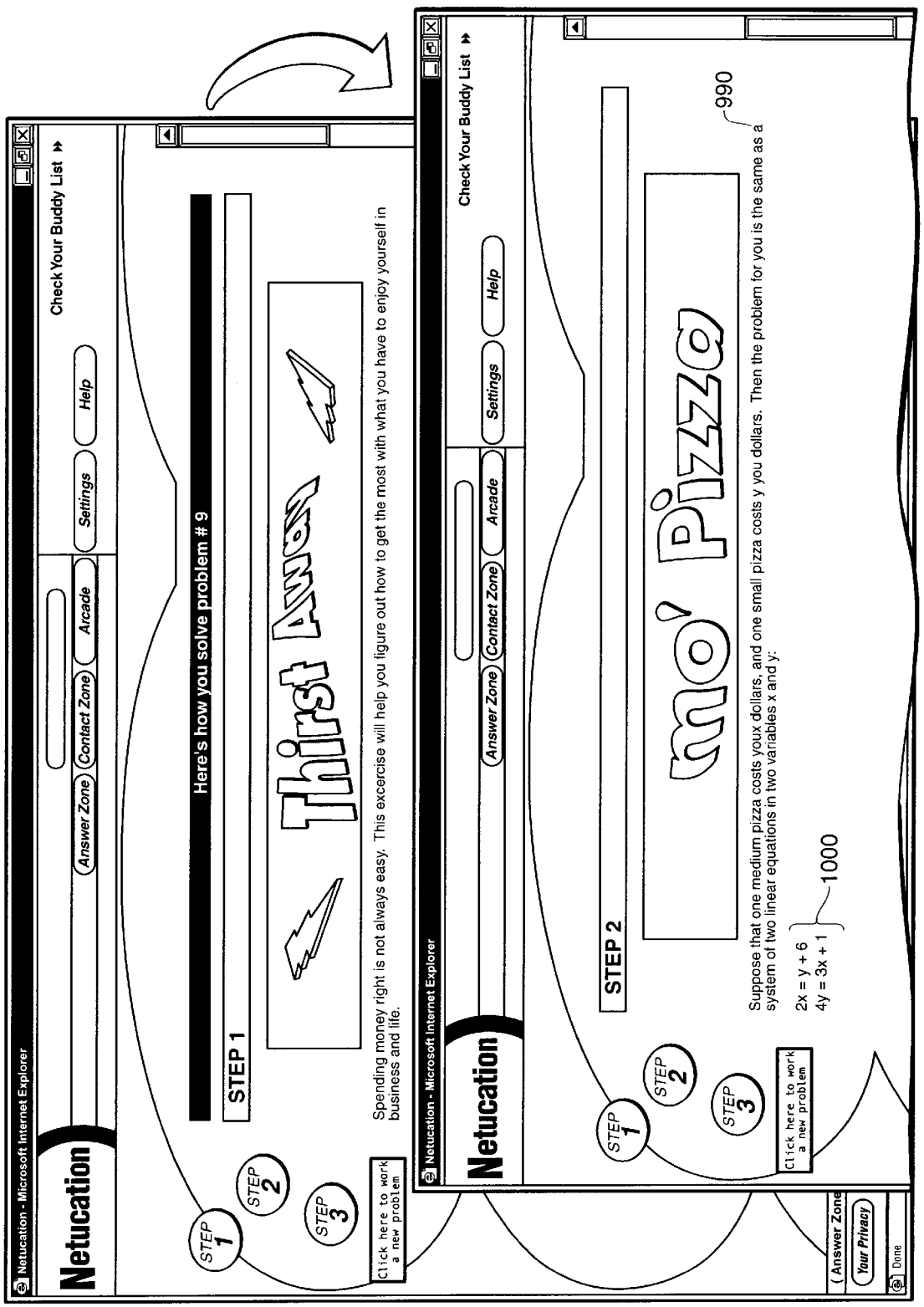
FIG. 16 is an example of a screen display depicting the first two steps in a solution to a problem, wherein the first step is a verbal explanation or example, and the second step includes a verbal explanation and a mathematical solution step.

Finally, FIGS. 16 and 17 show an example of a web page with a solution to an algebra problem. FIG. 16 shows the first step in the solution, with a verbal explanation 990 and the first mathematical step of the solution 1000. FIG. 17 shows the additional verbal explanations and steps involved in solving that particular algebra problem. FIG. 17 also includes a text box 1100 enabling the user to request additional problems of the same type, as described in step 645 of FIG. 8, or enabling the user to go to a chat room.

I claim:

1. A method of providing a solution to a problem comprising the steps of:
   providing a subject object stored in computer readable memory, said subject object comprising a plurality of index codes and a plurality of subject topics in varying degrees of specificity, and wherein each subject topic is associated with an index code;
   providing a second object stored in computer readable memory, said second object comprising a record of at least one identifying property of at least one textbook problem, said record comprising an index code from the subject object and a problem variable value set comprising at least one value element;
   providing a template object stored in computer readable memory, said template object comprising a plurality of indexed template solutions to problems, wherein each of said plurality of template solutions comprises a variable element and is characterized by an index code from the subject object;
   providing a first computer program capable of matching like index codes and replacing variable elements with value elements;
   providing a second computer program capable of real-time math computation;
   receiving, using a computer, a request for a solution to the problem;
   accessing, using a computer, a template solution comprising at least one variable element and a problem variable value set comprising at least one value element;
   replacing, using the first computer program, said variable element with said value element to form an interim solution to the problem, said interim solution comprising a mathematical equation imbedded therein;
   running, using the second computer program, a solution to the mathematical equation imbedded in the template solution to generate the solution to the problem; and
   transmitting, using a computer, said solution to the problem over a computer network.

2. The method of claim 1, further comprising the step of providing an indexed exposition object comprising a plurality of expositions, each of which is characterized by an index code from the subject object.

3. The method of claim 1, further comprising the step of providing a graphical user interface comprising at least one data input field for inputting data comprising an identifying property of a textbook.

4. The method of claim 1, further comprising the step of providing a graphical user interface comprising at least one data input field for inputting data comprising an identifying property of a problem from a textbook.

5. The method of claim 1, wherein the second object further comprises at least one record of a textbook, said record comprising at least one identifying property.

6. The method of claim 5, wherein the at least one identifying proper is an ISBN number.

7. The method of claim 1, further comprising the step of providing a textbook object stored in computer readable memory, said textbook object comprising at least one record of a textbook, said record comprising at least one identifying property of said textbook.

8. A method for providing a solution to a problem comprising the steps of:
   providing a graphical user interface comprising at least one data input field for inputting data comprising an identifying property of a textbook;
   receiving, using a computer, a request for a solution to the problem;
   accessing, using a computer, a record from a first object, said record comprising a value element;
   accessing, using a computer, a record from a template object, said template object comprising a plurality of records of template solutions to problems;
   interfacing, using a computer, the record from the first object and the record from the template object for generating a solution to the problem; and
   transmitting, using a computer, said solution over a computer network.

9. The method of claim 8, wherein the value element is taken from a problem from a textbook.

10. The method of claim 8, wherein the problem is a math problem.

11. The method of claim 8, wherein the problem is a physics problem.

12. The method of claim 8, wherein the problem is a chemistry problem.

13. The method of claim 8, wherein the problem is a physical science problem.

14. The method of claim 8, wherein the problem is a computer science problem.

15. The method of claim 8, wherein the problem is an engineering problem.

16. The method of claim 8, wherein the solution is animated.

17. The method of claim 8, wherein the record from the template object comprises an animated template solution to a problem.

18. The method of claim 8, wherein the identifying property of a textbook is an ISBN number associated with said textbook.

19. The method of claim 8, wherein the identifying property of a textbook is an author's name.

20. The method of claim 8, wherein the identifying property of a textbook comprises an identifying property of a problem from a textbook.

21. The method of claim 8, wherein the solution to the problem comprises a mathematical equation imbedded therein, said method further comprising the steps of:

provide a math computation program, said math computation program capable of running the solution to the mathematical equation; and running the solution to the mathematical equation.

22. The method of claim 8, wherein the first object is a textbook problem object comprising a plurality of records of textbook problems.

23. The method of claim 8, wherein the first object is a textbook and problem object, comprising a plurality of records of textbooks, each textbook record being associated with a plurality of records of textbook problems.

24. A method for providing a solution to a math problem comprising the steps of:

receiving, using a computer, a request for a solution to the math problem;

accessing, using a computer, a record from a first object, said record comprising a value element;

accessing, using a computer, a record from a template object, said template object comprising a plurality of records of template solutions to problems;

interfacing, using a computer, the record from the first object and the record from the template object for generating a solution to the math problem; and transmitting, using a computer, said solution over a computer network.

25. The method of claim 24, wherein the solution is animated.

26. The method of claim 24, herein the solution to the problem comprises a mathematical equation imbedded therein, said method further comprising the steps of:

providing a math computation program, said math computation program capable of running the solution to the mathematical equation; and running the solution to the mathematical equation.

27. The method of claim 24, wherein the first object is a textbook problem object comprising a plurality of records of textbook problems.

28. The method of claim 24, wherein the first object is a textbook and problem object, comprising a plurality of records of textbooks, each textbook record being associated with a plurality of records of textbook problems.

29. A method for providing a solution to a physics problem comprising the steps of:

receiving, using a computer, a request for a solution to the physics problem;

accessing, using a computer, a record from a first object, said record comprising a value element;

accessing, using a computer, a record from a template object, said template object comprising a plurality of records of template solutions to problems;

interfacing, using a computer, the record from the first object and the record from the template object for generating a solution to the physics problem; and transmitting, using a computer, said solution over a computer network.

30. The method of claim 29, wherein the solution is animated.

31. The method of claim 29, wherein the solution to the problem comprises a mathematical equation imbedded therein, said method further comprising the steps of:

providing a math computation program, said math computation program capable of running the solution to the mathematical equation; and running the solution to the mathematical equation.

32. The method of claim 29, wherein the first object is a textbook problem object comprising a plurality of records of textbook problems.

33. The method of claim 29, wherein the first object is a textbook and problem object, comprising a plurality of records of textbooks, each textbook record being associated with a plurality of records of textbook problems.

34. A method for providing a solution to a chemistry problem comprising the steps of:

receiving, using a computer, a request for a solution to the chemistry problem;

accessing, using a computer, a record from a first object, said record comprising a value element;

accessing, using a computer, a record from a template object, said template object comprising a plurality of records of template solutions to problems;

interfacing, using a computer, the record from the first object and the record from the template object for generating a solution to the chemistry problem; and transmitting, using a computer, said solution over a computer network.

35. The method of claim 34, wherein the solution is animated.

36. The method of claim 34, wherein the solution to the problem comprises a mathematical equation imbedded therein, said method further comprising the steps of:

providing a math computation program, said math computation program capable of running the solution to the mathematical equation; and running the solution to the mathematical equation.

37. The method of claim 34, wherein the first object is a textbook problem object comprising a plurality of records of textbook problems.

38. The method of claim 34, wherein the first object is a textbook and problem object, comprising a plurality of records of textbooks, each textbook record being associated with a plurality of records of textbook problems.

39. A method for providing a solution to a computer science problem comprising the steps of:

receiving, using a computer, a request for a solution to the computer science problem;

accessing, using a computer, a record from a first object, said record comprising a value element;

accessing, using a computer, a record from a template object, said template object comprising a plurality of records of template solutions to problems;

interfacing, using a computer, the record from the first object and the record from the template object for generating a solution to the computer science problem; and transmitting, using a computer, said solution over a computer network.

40. A method for providing a solution to an engineering problem comprising the steps of:

receiving, using a computer, a request for a solution to the engineering problem;

accessing, using a computer, a record from a first object, said record comprising a value element;

accessing, using a computer, a record from a template object, said template object comprising a plurality of records of template solutions to problems;

interfacing, using a computer, the record from the first object and the record from the template object for generating a solution to the engineering problem; and transmitting, using a computer, said solution over a computer network.

41. A system for providing a solution to a problem comprising:

a computer readable medium comprising:
a subject object comprising a plurality of index codes;
a template object comprising a plurality of template solutions to problems, wherein each of said plurality of template solutions comprises at least one variable element and is characterized by an index code from the subject object; and
a textbook problem object comprising a plurality of records of textbook problems, wherein each of said records comprises an index code from the subject object and a problem variable value set comprising at least one value element;

a graphical user interface comprising at least one data input field for inputting data comprising an identifying property of a textbook; and a computer program capable of matching an index code associated with a template solution with an index code from a record of a textbook problem.

42. The system of claim 41, wherein the computer program is further capable of replacing a variable element with a value element to form a solution to a problem.

43. The system of claim 41, wherein the value element of the problem variable value set is a value from a problem in a textbook.

44. The system of claim 41, further comprising a computer program capable of real-time math computation.

45. The system of claim 41, wherein the computer readable medium further comprises a textbook object comprising data comprising at least one identifying property of at least one textbook.

46. The system of claim 45, wherein the data comprising said at least one identifying property is an ISBN number.

47. The system of claim 45, wherein the data comprising said at least one identifying property is an Author's name.

48. The system of claim 41, wherein the subject object further comprises a plurality of subject topics in varying degrees of specificity, and wherein each subject topic is associated with an index code.

49. The system of claim 48, wherein the computer readable medium further comprises an indexed exposition object comprising a plurality of expositions, each of which is associated with a subject topic from the subject object.

50. The system of claim 49, wherein each exposition of the exposition object is characterized by an index code corresponding to its associated subject topic from the subject object.

51. A system for providing a solution to a problem comprising:

a computer readable medium comprising:
a subject object comprising a plurality of index codes;
a template object comprising a plurality of template solutions to problems, wherein each of said plurality of template solutions comprises at least one variable element and is characterized by an index code from the subject object; and
a textbook problem object comprising a plurality of records of textbook problems, wherein each of said records comprises an index code from the subject object and a problem variable value set comprising at least one value element;

a computer program capable of real-time math computation; and a computer program capable of matching an index code associated with a template solution with an index code from a record of a textbook problem.

52. A system for providing a solution to a problem comprising:

a computer readable medium comprising:
a subject object comprising a plurality of index codes;
a template object comprising a plurality of template solutions to problems, wherein each of said plurality of template solutions comprises at least one variable element and is characterized by an index code from the subject object;
a textbook problem object comprising a plurality of records of textbook problems, wherein each of said records comprises an index code from the subject object and a problem variable value set comprising at least one value element;
a textbook object comprising data comprising at least one identifying property of at least one textbook; and a computer program capable of matching an index code associated with a template solution with an index code from a record of a textbook problem.

53. The system of claim 52, wherein the data comprising said at least one identifying property of at least one textbook is an ISBN number.

54. The system of claim 52, wherein the data comprising said at least one identifying property of at least one textbook is an author's name.

55. A method for providing a solution to a problem comprising the steps of:

providing a graphical user interface comprising at least one data input field for inputting data comprising an identifying property of a textbook;

providing a first object stored in computer readable memory, said object comprising a plurality of problem variable value sets, wherein each of said problem variable value sets comprises a value element;

providing a template object stored in computer readable memory, said template object comprising a plurality of template solutions to problems, wherein each of said plurality of template solutions comprises a variable element;

providing a computer program capable of replacing variable elements with value elements;

receiving, using a computer, a request for a solution to the problem; and replacing, using the computer program, the variable element of one of the plurality of template solutions with the value element of one of the plurality of problem variable value sets to form a solution to the problem.

56. A method for providing a solution to a math problem from a textbook comprising the steps of:

receiving, using a computer, a request for a solution to the problem, said request comprising an identifying property of the problem;

searching, using a computer, a database of solutions to textbook problems, said database comprising the solution to the problem, said solution comprising an identifying property;

identifying, using a computer, a solution to the problem by matching the identifying property of the request to the identifying property of the solution; and transmitting, using a computer, said solution over a global computer network.

57. A method for providing a solution to a chemistry problem from a textbook comprising the steps of:

receiving, using a computer, a request for a solution to the problem, said request comprising an identifying property of the problem;

searching, using a computer, a database of solutions to textbook problems, said database comprising the solution to the problem, said solution comprising an identifying property;

identifying, using a computer, a solution to the problem by matching the identifying property of the request to the identifying property of the solution; and transmitting, using a computer, said solution over a global computer network.

58. A method for providing a solution to a physics problem from a textbook comprising the steps of:

receiving, using a computer, a request for a solution to the problem, said request comprising an identifying property of the problem;

searching, using a computer, a database of solutions to textbook problems, said database comprising the solution to the problem, said solution comprising an identifying property;

identifying, using a computer, a solution to the problem by matching the identifying property of the request to the identifying property of the solution; and transmitting, using a computer, said solution over a global computer network.

59. A method for providing a solution to a problem from a textbook comprising the steps of:

receiving, using a computer, a request for a solution to the problem, said request comprising an identifying property of the problem;

searching, using a computer, a database of solutions to textbook problems, said database comprising the solution to the problem, said solution comprising an identifying property, wherein the identifying property is the number of the problem in the textbook;

identifying, using a computer, a solution to the problem by matching the identifying property of the request to the identifying property of the solution, wherein the identifying property of the request is the number of the problem in the textbook; and transmitting, using a computer, said solution over a global computer network.

60. A method for providing a solution to a problem from a textbook comprising the steps of:

receiving, using a computer, a request for a solution to the problem, said request comprising an identifying property of the problem;

searching, using a computer, a database of solutions to textbook problems, said database comprising the solution to the problem, said solution comprising an identifying property;

identifying, using a computer, a solution to the problem by matching the identifying property of the request to the identifying property of the solution; and transmitting, using a computer, said solution over a global computer network, wherein said solution is animated.

61. A method for providing a solution to a problem from a textbook comprising the steps of:

receiving, using a computer, a request for a solution to the problem, said request comprising an identifying property of the problem;

searching, using a computer, a database of solutions to textbook problems, said database comprising the solution to the problem, said solution comprising an identifying property;

identifying, using a computer, a solution to the problem by matching the identifying property of the request to the identifying property of the solution; and transmitting, using a computer, said solution over a global computer network, wherein the solution is transmitted in a video stream.

* * * * *